United States Patent Office 2,988,506
Patented June 13, 1961

2,988,506
OXIDATION INHIBITION OF OLEAGINOUS MATERIALS

Lorne W. Sproule and Laurence F. King, Sarnia, Ontario, and Warren C. Pattenden, Courtright, Ontario, Canada, assignors to Esso Research and Engineering Company, a corporation of Delaware
No Drawing. Filed June 29, 1954, Ser. No. 440,236
15 Claims. (Cl. 252—18)

The present invention relates to improved oxidation inhibition of substantially anhydrous organic oleaginous materials, especially lubricating oils and greases. It relates also to substantially anhydrous oil and grease compositions which are so treated as to give them exceptionally long life in resisting oxidation and related forms of product deterioration.

This application is a continuation-in-part of copending applications Serial Nos. 188,298, filed October 4, 1950; 287,814, filed May 14, 1952, which in turn is a continuation-in-part of copending applications Serial Nos. 230,414 and 230,415, filed June 7, 1951; and Serial No. 376,527, filed August 25, 1953, which in turn is a continuation-in-part of copending application Serial No. 188,298, filed October 4, 1950. All five of the above applications have now been abandoned.

In the prior art numerous compositions have been proposed for adding mineral base oils to prolong their resistance to oxidation in contact with the atmosphere, or with other oxidizing materials. Various refining processes for eliminating or minimizing oxidation tendencies have also been proposed. Mineral base oils are quite inert chemically, but even the best of them are gradually oxidized in the presence of air or other oxygen-containing materials to produce acidic products, gums, sludge forming materials, and other objectionable products which cause quality deterioration. Both organic and inorganic materials have been proposed in the past for addition to, or treatment of mineral base oils to inhibit such oxidation and some of these have been quite successful. Unfortunately, many of the successful oxidation inhibitors contribute to other undesirable characteristics, such as corrosion of metals, reduction in viscosity index of lubricating oils, reduction in fuel values of fuel oils, and the like. Furthermore, most of the oxidation inhibitors hitherto used in mineral oils are relatively expensive.

The prior art has also suggested that various phosphorus containing compounds have certain merits as additives for various types of oils. Thus, phosphorus sulfide treated organic compounds, such as produce the thiophosphates, and the metal salts of such products have been proposed for use as anti-oxidants, extreme pressure additives for lubricants, and the like. Fatty oils, treated with phosphorus or with phosphorus compounds, have been suggested as additives for oils.

Sodium phosphates as such have been proposed as ingredients of aqueous compositions, used as a type of lubricant in certain metal working operations. In these cases, however, the phosphates are dissolved in water. The aqueous compositions in some cases may be emulsified with an oil containing an emulsifier, e.g. a fatty oil, or the like. In these cases, obviously, the phosphates, though inorganic in nature, are in aqueous solution or in emulsions where water is a major ingredient. Also, the temperatures ordinarily associated with the application of these cutting oils are not conducive to undesirably rapid oxidation of organic materials.

The present invention is based on the discovery that certain of the poly-alkali metal salts of inorganic polybasic oxygen acids of elements of atomic numbers 14—15, particularly the sodium and potassium salts, have a peculiar property of inhibiting a secondary stage of oxidation involved in the deterioration of organic oleaginous materials in the substantial absence of water. By polymetal salts is meant those having at least two alkali metal atoms attached to a polybasic acid group. The salts used are oil insoluble or very substantially so, which represents a departure from the prior art. For example, suitable alkali metal salts are the ortho- and pyrophosphates or those derived from the polybasic oxygen acids of silicon, such as the ortho-, sesqui-, di- and metasilicates.

While the exact mechanism of this inhibition is not clearly understood, it appears that ordinary oxidation in air, of most oleaginous materials, e.g. of lubricating oils and greases, proceeds in at least two stages. These are (1) the formation of peroxides and (2) the decomposition of the peroxides to form sludge-producing organic acids. Evidently, the basic salts neutralize these acids as rapidly as they are formed. This prevents both the accumulation of sludge and the acceleration of the primary oxidation stage (peroxide formation) which usually occurs in the presence of such acids and sludge. The neutralization reaction proceeds in preference to any reaction of the basic salts with carbon dioxide present in the reaction medium or in the surrounding air.

This theory appears to be substantiated by the periodic analysis of certain salts during the oxidation reaction. The total alkalinity of salts suspended in oil decreases with time, but the deterioration of the oil continues to be very effectively inhibited provided the salt used has an original alkalinity of at least 21.5% $Na_2O$ (as determined by the A.S.T.M. D-501-49 test). At the same time soap concentration increases, as indicated by increasing concentration of the alkali metal elements (determined as ash) which are dissolved in the oil.

The choice of salts, i.e. the alkaline salts, for this purpose appears to vary somewhat with the temperature range for which stabilization is most important. In general, the poly-sodium and -potassium phosphates and silicates are most suitable for high temperature service, e.g. for temperatures from about 200° up to about 400° F. or higher. The poly-alkali metal phosphates and silicates are all sufficiently basic for the purposes of the invention. Bases which react with $CO_2$ in preference to any reaction with other organic acids, such as most alkali and alkaline earth metal hydroxides, alkanol amines, etc., are not at all satisfactory because they are converted to carbonates before they can react with the other organic acids, and carbonates have been found to be, in general, relatively ineffective oxidation inhibitors. Very weakly basic salts, such as sodium acetate, furoate, benzoate, nitrite, etc., are even less effective. For many applications, the use of trisodium phosphate is critical for optimum results.

The essence of the present invention, then, is the discovery of an optimum group of effective inhibitors. The proportions which are useful are quite small, e.g. as low as 0.01% of the weight of the treated organic oil. Proportions of at least 0.1% are desirable and the range of 0.5 to 10% is preferred. Of the phosphates, tri-sodium phosphate is the most effective, the tri-potassium salt being comparable in many applications. Lithium salts are less desirable and in many cases ineffective. The di-metal mono acid phosphate is effective but to a lesser degree. The mono-metal di-acid phosphate is quite ineffective. The various other phosphates, e.g. pyrophosphate, meta-phosphate and polyphosphates, are effective in varying degrees.

The same is true, in general, of the silicates. The sodium and potassium salts, in general, are quite equivalent as would probably be expected. For effective oxidation inhibition at high temperatures (say about 200°–400° F.) the inhibitors appear to be decreasingly effective in approximately the following order. The first seven members of the list are effective at temperatures above 200° F.

$Na_3PO_4$ or $K_3PO_4$
$Na_4SiO_4$ or $K_4SiO_4$
$Na_6Si_2O_7$ or $K_6Si_2O_7$
$Na_2SiO_3$ or $K_2SiO_3$
$Na_4P_2O_7$ or $K_4P_2O_7$
$Na_2Si_2O_5$ or $K_2Si_2O_5$
$Na_2HPO_4$ or $K_2HPO_4$
Sodium acetate or potassium acetate
Sodium furoate
Sodium benzoate
NaOH
$NaH_2PO_4$, etc.

In general, the poly-metal salts are the most effective inhibitors because they are capable of decomposing stepwise in the presence of mineral oils to salts of lower metal content.

It appears that the tri-metal salts, for example, first decompose in the presence of acids to the di-metal salts and then to mono-metal salts, according to the following general formulae:

(1) $Na_3PO_4 + RCOOH \rightarrow Na_2HPO_4 + RCOO\text{—}Na$
(2) $Na_2HPO_4 + RCOOH \rightarrow NaH_2PO_4 + RCOO\text{—}Na$
(3) $Na_4SiO_4 + 2RCOOH \rightarrow Na_2SiO_3 + 2RCOONa + H_2O$ The metal-di-acid salt, e.g. $NaH_2PO_4$ is such a weak inhibitor as to indicate that the reaction stops at about this stage. These formulae suggest a clear reason why the highest metal salts are superior.

Experimental data show also that in the initial stages of an oxidation life test on oil or grease, there is very little, if any, difference between the highest metal salt and the next in the series. Up to 300 hours (at 300° F.) these appear to be quite equivalent. Thereafter, however, the tri-salt (phosphate or silicate) begins to show marked superiority over the di-metal salt.

The oil chosen for a series of comparative tests was a phenol treated Tia Juana mineral oil distillate having a viscosity of about 675 S.S.U. at 100° F. and a viscosity index of 80. Rates of oxidation reaction in air at elevated temperatures were measured for the following three systems:

(a) The straight mineral oil,
(b) The oil+2% by weight of mechanically mixed anhydrous di-sodium phosphate ($Na_2HPO_4$),
(c) The oil+2% by weight of mechanically mixed anhydrous tri-sodium phosphate ($Na_3PO_4$).

The reaction vessels used were stainless steel dishes (5" x 5" x 1¼") which were placed in an oven at 300° F. for various periods of time. At suitable intervals the contents of the dishes were analyzed. The sludge was removed quantitatively by a combination of centrifuging, followed by dilution with ASTM precipitation naphtha in the ratio of 10:1, and filtration. The oil was inspected for increase in viscosity, neutralization number and peroxide value. The sodium phosphate was removed for analysis by decanting most of the oil from the salt and washing the latter in a Büchner funnel with naphtha until free of oil. The salt was dried in an oven at 250° F., cooled in a desiccator and weighed. It was then analyzed for total alkalinity (expressed as percent $Na_2O$) according to ASTM method D–501–49 which involves titration with standard acid using methyl orange as indicator. The mineral oil phase after separation of the salt was analyzed spectrographically for sodium and phosphorus.

In all cases, the tri-metal phosphate showed marked superiority in reducing sludge formation, evaporation loss, increase in viscosity and increase in neutralization number. All these are considered reliable criteria of the progress of oxidation. Results are compiled in Table I. Tests were made at the end of the test periods indicated, using the blank oil (a), 2% $Na_2HPO_4$ (b), and 2% $Na_3PO_4$ (c).

TABLE I
*Inspections of oxidized mineral oil-sodium phosphate systems [1]*

| Duration of test, hours | 0 | | | 150 | | | 290 | | | 410 | | | 750 | | |
|---|---|---|---|---|---|---|---|---|---|---|---|---|---|---|---|
| | (a) | (b) | (c) | (a) | (b) | (c) | (a) | (b) | (b) | (a) | (b) | (c) | (a) | (b) | (c) |
| Mineral oil portion: | | | | | | | | | | | | | | | |
| Sludge (naphtha insoluble) weight percent | | | | 1.5 | Nil | Nil | 1.9 | Nil | Nil | | 0.5 | Nil | 8.9 | 5.5 | Nil |
| Evaporation loss, weight percent | | | | 7 | 4 | 4 | 7.5 | 4 | 4 | | 4 | 4 | 16 | 13 | 4.5 |
| V/100° F.S.S.U., corresponding cut | | | | 815 | 795 | 805 | 820 | 800 | 795 | | 795 | 795 | 845 | 835 | 805 |
| V/100° F.S.S.U., after test | | | | 1,302 | 866 | 965 | 1,518 | 1,008 | 995 | | 1,150 | 1,055 | 3,179 | 2,424 | 1,205 |
| Increase in visc. due to oxidn., percent | | | | 59 | 9 | 17 | 85 | 26 | 25 | | 44 | 32 | 280 | 190 | 50 |
| Neutralization number | 0.2 | 0.2 | 0.2 | 5.6 | 0.9 | 0.6 | 8.5 | 2.0 | 0.8 | | 4.3 | 1.3 | 25 | 14 | 3.2 |
| Peroxide number | Nil | Nil | Nil | 3.0 | 3.8 | 3.6 | 3.3 | 4.9 | 4.0 | | 4.5 | 5.0 | 3.0 | 2.3 | 3.0 |
| Phosphorus [2] | | Nil | Nil | | Nil | Nil | | Nil | Nil | | Nil | Nil | | Nil | Nil |
| Sodium [2] | | Nil | Nil | | Nil | Tr. | | Nil | Tr. | | Nil | Tr. | | Nil | [4]Tr. |
| Salt portion: | | | | | | | | | | | | | | | |
| Total alkalinity ($Na_2O$), percent [3] | | 21.8 | 36.4 | | 20.5 | 29.5 | | 19.5 | 25.9 | | 19.2 | 23.8 | | 18.0 | 21.1 |
| Weight salt recovered, percent | | 95 | 95 | | 94 | 93 | | 94 | 94 | | 95 | 88 | | | 84 |

[1] 675 S.S.U. visc. at 100° F., 80 V.I. mineral oil mechanically mixed with 2% of the anhydrous salt.
[2] Spectrographic analysis.
[3] Determined by slight modification of ASTM method D–501–49 for trisodium phosphate.
[4] This sample had sulfated ash content of 0.70% (as $Na_2SO_4$); this corresponds to 3.0% oil soluble sodium soap (as Na oleate).

There appears to be sufficient Brownian movement or other motion in fluid oils to insure adequate contact of the oil with the salt, even if the salt is not well dispersed. The quantity of salt needed for effective inhibition may vary considerably. Due to its relative insolubility in oil, an excess should be provided in some form which can be taken up to replace salt consumed in soap formation. It was suggested in the parent application, Serial No. 230,414, that a fibrous medium, such as a filter, might hold a supply of the salt available for its function. Where the product is a grease (or petrolatum or other relatively non-fluid medium) the salt should, of course, be dispersed throughout for effective inhibition. However, in greases the thickener aids in maintaining the inhibitor salt in dispersion, which is a particular advantage of the addition of the inhibitor salts to greases in accordance with this invention.

As previously indicated, proportions of 0.1 to 10% or more, preferably about 0.5-10%, based on the weight of the treated lubricant may be needed, depending on the oxidation life required; the means for dispersing or holding in suspension, and other obvious factors. However, inhibitor salt concentrates containing as much as 40% by weight of the inhibitor salt may be prepared for subsequent dilution to lubricants of lower salt concentration.

In order to determine whether there is reaction of salt with oil in the substantial absence of oxygen, a large excess of finely divided anhydrous salt was added to oil kept under a nitrogen blanket and maintained at a temperature of 300° F. Thus, finely divided anhydrous $Na_3PO_4$ was added in proportions of 20% of the weight of the oil (a 30 S.A.E. mineral base oil) and stirred vigorously for 35 hours. Water was added dropwise in an effort to catalyze the reaction. The oil was decanted and filtered hot until optically clear. A celite filter aid was used and, as a rule, it was necessary to filter twice, through papers of different fineness (41 and 7). Various other salts were tested in the same manner and the results are compiled in Table II below.

It is interesting to note that the chemical reactions involved are not influenced to any great extent by the atmosphere in contact with the oil during the high temperature oxidation test. The results obtained are quite similar, whether a blanket of nitrogen, air or oxygen is used. The following data (B-3) were obtained using 2% $Na_3PO_4$, the oil being held under an atmosphere of oxygen at normal atmospheric pressure. The blank oil had a viscosity of 749 S.S.U. at 100° F. and 74.2 at 210° F. Its viscosity index was 90, its sulfated ash content 0.35%, and it showed a slightly alkaline reaction upon extraction with hot water. In the oxidation test at 300° F., the oil had a Robinson color of 8½ at the start, ½ after 1,000 hours. Naphtha-insoluble sludge was nil, both at the beginning and at the end of the 1,000 hour test.

ever, was an exception. Apparently the oil contained some ingredients of an acidic nature which reacted with the sodium salts but would not react with calcium salts.

Moreover, the oils treated with phosphate and silicate gave a stronger alkaline reaction than the others. Those treated with sodium phosphate also showed a slight phosphorous content but it is not clear whether the sodium salt is present in the form of a phosphate, for example an organic phosphate, or not.

As also indicated in Table II the pretreated oils were afterward subjected to the oxidation test at 300° F., as described above in connection with Table I. No further salt was added. It was found that the oils pretreated with phosphate and silicate were quite stable towards oxidation whereas those treated with sodium hydroxide, sodium carbonate and calcium phosphate were not. Treatment with the hydroxide and carbonate led to rusting of the steel pot and formation of oil soluble iron compounds, which apparently catalyzed the breakdown of the oil in subsequent oxidation tests.

It will be understood that while various proportions of the salts listed above may be used, in general these should be available for intimate contact with the lubricant composition. With mobile products contacting is sufficient. With immobile products a fine dispersion or suspension of the oil-insoluble materials will be requisite to obtain good contacting. In the case of lubricating greases, for example, the preferred method is to form a complex between the soap and the salt. While specifically applicable to lubricating compositions, such as mineral oils, petrolatums and greases, the present invention is applicable also to hydrocarbon fuels and other related organic products. The contacting can be carried out at any reasonable tem-

TABLE II

*Inspections of mineral oil after pre-treatment with alkaline salts at 300° F.*[1]

| Designation | A (blank) | B-1 | B-2 | B-3 | C | D | E | F |
|---|---|---|---|---|---|---|---|---|
| Salt used | Nil | $Na_3PO_4$ | $Na_3PO_4$ | $Na_3PO_4$ | NaOH | $Na_2CO_3$ | $Na_6Si_2O_7$ | $Ca_3(PO_4)_2$ |
| Mineral oil: | | | | | | | | |
| V/100, S.S.U | 587 | 734 | 778 | 749 | 657 | 637 | 606 | 599 |
| V/210, S.S.U | 64.4 | 75.0 | 76.1 | 74.2 | 67.7 | 65.8 | 65.1 | |
| V.I. | 81 | 95 | 92 | 90 | 82 | | 77 | |
| Pour ° F | 10 | 10 | 10 | | | | 81 | |
| Sulfated ash percent | Nil | 0.64 | 0.38 | 0.35 | 0.30 | 0.08 | 0.18 | Nil |
| Phosphorus percent | | 0.02 | 0.025 | | | | | Nil |
| Extraction with hot water [2] | Neut. | Alk. | Alk. | Alk. | Sl. alk. | Sl. alk. | Alk. | Neut. |
| Oxidation test at 300° F.: [3] | | | | | | | | |
| V/100 S.S.U. after— | | | | | | | | |
| 250 hrs | a 1,450 | | | | | | 748 | |
| 1,000 hrs | 3,100+ | 855 | 994 | | | | | |
| Color (Robinson): | | | | | | | | |
| At start | 10½ | 9 | 9 | 8½ | 5 | 1½ | 8¾ | 4 |
| After 250 hrs | Black | | | | Black | [4] Black | ¼ | Black |
| After 1,000 hrs | Black | ½ | | ½ | | | | |
| Sludge (naphtha insol.) weight percent: | | | | | | | | |
| At start | Nil | Nil | Nil | Nil | Nil | Nil | Nil | Nil |
| After 250 hrs | 2.0 | Nil | Nil | | 5.6 | [4] 6.5 | Nil | Heavy |
| After 1,000 hrs | 8.25; 8.9+ | Nil | Nil | Nil | | | | |
| Neut. number: | | | | | | | | |
| At start | 0.2 | 0.05 | 0.05 | | 0.15 | 0.3 | 0.1 | 0.2 |
| After 250 hrs | 8 | | | | | | 1.3 | |
| After 1,000 hrs | 25+ | 1.7 | | | | | | |
| Peroxide number: | | | | | | | | |
| At start | Nil | 3.5 | 2.4 | | 3.1 | 5.5 | 2.8 | |
| After 250 hrs | 3.2 | | | | | | 2.9 | |
| After 1,000 hrs | 3.0 | 3.5 | | | | | | |
| Evaporation Loss, weight percent after— | | | | | | | | |
| 250 hrs | 7.3 | 4.0 | | | 18.1 | [4] 14.9 | 3.9 | |
| 1,000 hrs | 12.7 | 7.9 | 9.0 | | | | | |

[1] Phenol extracted Tia Juana Distillate heated with agitation in mild steel pot in presence of approx. 20% anhydrous salt for 35 hours under nitrogen (Example B-2 had air instead of nitrogen). Water added dropwise from separatory funnel during reaction and flashed off.
[2] Qualitative test for alkalinity in separatory funnel using phenolphthalein as indicator.
[3] Oxidation data on blank oil are chiefly those obtained previously. (See Table I)
[4] Actual time for this oil was 335 hours.
a Approximately.

It will be noted that this drastic pretreatment with the various salts actually did incorporate some metal (sodium) into the oil, as evidenced by the ash content, in most cases. Treatment with calcium phosphate, howperature and the use of dispersants as solubilizers is optional. In some cases it may be desirable to treat a mineral oil with the salt inhibitors as above described, remove unreacted salt by filtration or the like and use the oil-salt reaction product so formed as an inhibitor for systems containing or consisting of synthetic oils of the type described below.

When the present invention is applied to essentially liquid oleaginous materials, a small amount of the alkali metal salt, such as sodium phosphate, preferably $Na_3PO_4$, is used directly in or is contacted with the oil to be inhibited. The phosphate may be dispersed in the oil with the aid of a solubilizer or detergent, or it may be worked into the oil as a finely divided solid material. The salt is incorporated in the mineral oil in such a manner that at least a portion of such oil is continuously contacting the phosphate.

The alkali metal salt, preferably trisodium phosphate, may be ground or otherwise subdivided and suspended or dissolved in the hydrocarbon oil. When it is desired to dissolve the salt, which is oil-insoluble per se, a suitable detergent is added. This detergent may be any oil soluble metal salt, or equivalent detergent, that is effective to maintain or prolong the suspension. The preferred detergents are the alkali and alkaline earth metal sulfonates which are oil soluble, especially the oil soluble petroleum sulfonates of sodium and calcium. Tri-sodium phosphate forms an oil soluble complex with these sulfonates. Other detergents, such as the metal soaps of the $C_{16}$ to $C_{24}$ fatty acids, or of naphthenic acids help somewhat to hold the phosphate in solution or suspension. The alkali and alkaline earth metal soaps are preferred in all cases, especially the sodium and calcium soaps which ordinarily have superior oil solubility.

Alternatively, the oil may be contacted with the phosphate by passing the oil through a system where at least a portion of it is being brought continuously into intimate contact with finely divided salt. Thus a filter or filter cartridge, comprising a fibrous or other porous structure impregnated with finely divided phosphate, affords an excellent medium for bringing lubricating oil into intimate contact with the oxidation inhibiting salt. In many cases, particularly when the oils are subjected to frequent vibrations or other moving impulses, for example those occurring in transit and transportation, it is sufficient to suspend in the oil a piece of fibrous material, such as cloth, paper, etc., impregnated with the inhibitor salt of the invention.

Considerable data have been obtained showing exceptional oxidation inhibiting properties of trisodium phosphate mixed mechanically or otherwise contacted intimately with mineral oils. The resistance to oxidation of such oils, measured by comparing their saponification values before and after heating for extended periods, shows great improvement when trisodium phosphate is employed. One experimental procedure was as follows:

One hundred grams of the mineral oil to be tested was placed in a large Petri dish (6" diameter) and 4.4 grams of finely ground trisodium phosphate dodecahydrate (2.0 grams $Na_3PO_4$ anhydrous) were added. The dishes were placed in an oven at 300° F. and held at that temperature for 170 hours. It was observed that the salt rapidly lost its water of hydration at the test temperature. Controls were run simultaneously on the straight mineral oils. Even when prolonged heating evaporated much of the oil, leaving only the high boiling constituents, the phosphate treated material was remarkably clear. At the end of the test period, the oils were inspected in the usual manner and the results are shown in Table IV.

In one example, a low cold test SAE 20 oil, tested without the phosphate for comparative results, showed considerable formation of sludge in the experimental procedure of the preceding paragraph. This oil contained 0.96% by weight of naphtha-insoluble material as sludge. In the presence of tri-sodium phosphate this was entirely eliminated. The same oil showed a high increase in viscosity, actually amounting to 67% due to oxidation alone. In the presence of the phosphate this value was reduced to 15%. Other oils showed less difference; for example phenol extracted lubricating oil, but in all cases considerable improvement was achieved. The color degradation of both the low cold test oils, and the phenol extracted oils was considerable. The low cold test oil became so dark that its color could not be measured on the standard Robinson scale. The presence of phosphate effected a marked improvement in both types of oils. The neutralization numbers and the saponification values increased very markedly in both types of oils, and this increase was greatly reduced in the presence of the sodium phosphate.

A preferred procedure, previously mentioned, for incorporating the sodium phosphate in mineral oil is to prepare a complex between the sodium phosphate and an oil soluble metallic sulfonate, e.g. of petroleum derivation and to dissolve the complex in mineral oil. This is accomplished by adding an aqueous solution of sodium phosphate to an oil soluble petroleum sulfonate, e.g. sodium or calcium sulfonate. Thereafter, the mixture is heated to a temperature of about 300° F. to completely dehydrate it. The phosphate in this case is in actual solution in the oil and no separation of the salt from the oil occurs until a critical concentration of the phosphate in the sulfonate is reached. A sodium sulfonate concentrate (65% sulfonate, 35% oil) can absorb up to about 20% of $$Na_3PO_4.12H_2O$$

A 30% concentration of calcium sulfonate can absorb about the same quantity of the salt. On the basis of adding 5% of the sulfonate concentrate saturated with the phosphate, about 0.4% of anhydrous $Na_3PO_4$ can be incorporated in mineral oil. These proportions are quite adequate to give effective protection against oxidation. By adding more than 5% of the sulfonate base to the oil, larger quantities of the phosphate can, of course, be incorporated.

Alternatively, the finely divided phosphate can be suspended in the oil in other ways, for example, by mechanical means and detergents will assist in maintaining the dispersion. It is difficult, however, to obtain a sufficiently firm and stable dispersion, especially for long storage.

Another aspect of the present invention is the discovery that lubricating oils containing sodium phosphate solubilized by sodium or calcium sulfonate, have valuable extreme pressure lubricating properties. It is remarkable that the di-sodium monohydrogen and the mono-sodium dihydrogen phosphates exhibit no particular load-carrying properties. Experimental compositions were made by heating 100 grams of 65:35 sodium sulfonate concentrates with 20 grams of the sodium phosphate dodecahydrate (in aqueous solution) until anhydrous. A similar blend was made also with a 30% calcium sulfonate concentrate, adding 10 grams of the sodium phosphate hydrate. Each of these blends was dissolved in 5% concentration by weight in (1) a low cold test oil of SAE 20 grade and (2) a phenol extracted oil of the same grade. These products were tested on the standard Almen and Falex machines. The low cold test oil carried 4 weights on the Almen machine when the sulfonate was added without phosphate and 13 weights with the added phosphate salt. Similar results were obtained with the phenol extracted oil. The calcium sulfonate-phosphate additive produced the same results. On the Falex machine the phenol extracted oil, SAE 20 grade containing 5% sodium sulfonate concentrate, showed a rating of 500 lbs., whereas the same product containing 0.4% by weight of tri-sodium phosphate (anhydrous) showed a rating in excess of 4500 lbs.

Other experiments of similar type demonstrate the superiority of tri-sodium phosphate over mono- and di-sodium phosphates with respect to load-carrying properties. The results of these experiments are summarized in Table III below.

TABLE III

| Designation | Composition, weight percent ||||| E.P. tests (load at failure) ||
|---|---|---|---|---|---|---|---|
| | Base oil [1] | Sodium sulphonate | Sodium phosphate | Sodium phosphate (anal.) | Phosphorus (anal.) | Falex machine lbs. | Almen machine wts. |
| Blank | 95 | 5 | Nil | Nil | Nil | 500 | 6 |
| A | 95 | 4.6 | $Na_3PO_4$ (0.4) | 0.29 | 0.055 | 4,500+ | 13+ |
| B | 95 | 4.6 | $Na_2HPO_4$ (0.4) | 0.29 | 0.064 | 750 | 7 |
| C | 95 | 4.6 | $NaH_2PO_4$ (0.4) | 0.31 | 0.080 | 1,100 | 5 |

[1] Phenol extracted Leduc distillate, SAE 20 grade mineral oil.

It will be noted that tri-sodium phosphate afforded load-carrying properties which were a high multiple of those obtained with mono- or di-sodium phosphate. This improvement is, of course, in addition to the oxidation inhibiting effect of the tri-sodium phosphate. Di-sodium phosphate, while inferior with respect to load-carrying characteristics, remains a highly desirable anti-oxidant as shown more clearly hereinafter.

The outstanding results obtained indicate that the use of phosphate salt to protect mineral oils against oxidation has broad possibilities. The treatment appears to be applicable alike to heavy duty automotive lubricants, to heavy duty industrial oils, cutting oils, textile oils, twister ring lubricants, extreme pressure oils and greases, and rust preventatives.

A summary of test results showing various factors affected by the use of tri-sodium phosphate is given in the following Tables IV–VI.

TABLE IV
Inspections of oxidized mineral oils

| | Low cold test SAE 20 base [1] | Low cold test SAE 20 base plus 2.0 g.m. $Na_3PO_4$ | Phenol extracted SAE 20 base | Phenol extracted SAE 20 base plus 2.0 g.m. $Na_3PO_4$ |
|---|---|---|---|---|
| Naphtha insol. wt. percent | 0.96 | Nil | Nil | Nil |
| Loss in weight percent | 20.7 | 24.5 | 9.8 | 13.4 |
| V/100 S.U. of corresponding cut [2] | 404 | 428 | 321 | 340 |
| V/100 S.U. after test | 674 | 492 | 346 | 351 |
| Increase in vis. due to oxidation, percent | 67 | 15 | 8 | 3 |
| Robinson color (corr. cut) | 11 | 11 | 13 | 13 |
| Robinson color after test | Black | 4 | ½ | 9¼ |
| Neut. number (before test) | 0.05 | 0.05 | 0.12 | 0.12 |
| Neut. number (after test) | 2.5 | 0.15 | 0.33 | 0.14 |
| Sap. value (before test) | 0.14 | 0.14 | 0.14 | 0.14 |
| Sap. value (after test) | 4.5 | 0.6 | 1.2 | 0.6 |
| Peroxide number (before test) [3] | Nil | Nil | Nil | Nil |
| Peroxide number (after test) | 5.7 | 8.4 | 2.6 | 6.6 |

[1] L.C.T. 20 base: V/100=314; V.I.=45; P.E. 20 base: V/100=282; V.I.=80.
[2] Original oil was fractionated and reblended according to the fraction of the oil lost by evaporation during the oxidation test. This procedure was adopted to eliminate the variable of viscosity increase due to evaporation.
[3] Peroxide number of a synthetic sample of di-tertiary butyl peroxide in L.C.T. 20 base was found to be 2.86, which corresponded to 2.82 (calc.).

Additional data are shown in Tables V and VI, where oils treated with sulfonates were tested against those containing the sulfonate-phosphate complexes. Although the sulfonates, when used alone, greatly increase the formation of naphtha-insoluble sludge, this was completely eliminated by the use of the phosphate complex.

TABLE V
Inspections of oxidized mineral oils

| | L.C.T. 20 base +5% sod. sulfonate (65:35) | L.C.T. 20 base [1] +4.6% sod. sulfonate (65:35) +0.4% $Na_3PO_4$ | C.W. 20 base +5% sod. sulfonate (65:35) | C.W. 20 Base [1] +4.6% sod. sulfonate (65:35) +0.4% $Na_3PO_4$ |
|---|---|---|---|---|
| Naptha insol. weight percent | 7.3 | Nil | 2.6 | Nil |
| Loss in weight, percent | 21.6 | 23.6 | 10.8 | 11.5 |
| V/100 S.U. of corresponding cut [2] | 449 | 460 | 354 | 362 |
| V/100 S.U. after test | 650 | 604 | 437 | 400 |
| Increase in visc. due to oxidation percent | 45 | 31 | 24 | 10 |
| Robinson colour (corr. cut) | 5½ | 5½ | 9 | 9 |
| Robinson colour after test | Black | 2¼ | Black | 9 |
| Neut. number | 0.06 | 0.06 | 0.12 | 0.12 |
| Neut. number after test | | 0.77 | | 0.47 |
| Sap. value | 1.3 | 1.3 | 1.3 | 1.3 |
| Sap. value after test | | 1.9 | | 1.4 |
| Peroxide number | Nil | Nil | Nil | Nil |
| Peroxide number after test | 1.7 | 11.3 | 2.7 | 8.1 |

[1] 100 gms. sodium sulfonate concentrate (65%) heated with an aqueous solution of 20 gms. sodium phosphate hydrate until anhydrous. 5% of this base was dissolved in the mineral oil. L.C.T. 20 Base: V/100=314; V.I.=45; C.W. 20 base: V/100=282; V.I.=80.
[2] Original oil was fractionated and reblended according to the fraction of the oil lost by evaporation during oxidation test.

TABLE VI
Inspections of oxidized mineral oils

| | SAE 30 base +2% calcium sulfonate (30% conc.) | SAE 30 base [1] +1.92% Ca sulfonate +0.08% $Na_3PO_4$ | SAE 30 base +1.87% Ca sulfonate +0.13% $Na_3PO_4$ | SAE 30 base +1.83% Ca sulfonate +0.17% $Na_3PO_4$ |
|---|---|---|---|---|
| Naptha insoluble, weight percent | 4.75 | 1.0 | 0.13 | Nil |
| Loss in weight, percent | 6.1 | 5.5 | 3.3 | 3.9 |
| V/100 S.U. of corresponding cut [2] | 816 | 812 | 792 | 804 |
| V/100 S.U. after test | 1,075 | 907 | 881 | 859 |
| Increase in visc. due to oxidation, percent | 32 | 12 | 11 | 7 |
| Robinson colour (corr. cut) | 3¼ | 3¼ | 3¼ | 3¼ |
| Robinson colour after test | Black | Black | Black | 2 |
| Neut. number | 0.18 | 0.18 | 0.18 | 0.18 |
| Neut. number after test | | | | 0.25 |
| Sap. value | 0.3 | 0.3 | 0.3 | 0.3 |
| Sap. value after test | | | | 1.0 |
| Peroxide number | Nil | Nil | Nil | Nil |
| Peroxide number after test | | | | 7.1 |

[1] 100 gms. calcium sulfonate (30% conc'n in oil) heated with aqueous solution of 10 gms. sodium phosphate hydrate until anhydrous. 2% of this base was dissolved in the mineral oil (C.W. 30 base: V/100=675; V.I.=80). Two remaining compounded oils were prepared in similar manner using 15 gms. and 20 gms. sodium phosphate hydrate respectively.
[2] Original oil was fractionated and reblended according to the fraction of oil lost by evaporation during oxidation test.

In Table VI, a more viscous oil was used to minimize evaporation in the long sustained oven test.

Another result that was noted from the experimental work is that peroxide numbers are higher in the case of phosphate treated oils than in the untreated oils. It appears that when the sodium phosphate is present the process of oxidation is arrested at the peroxide stage. Further decomposition, characteristic of the untreated mineral oils, is greatly retarded by the phosphate treatment. The increase in peroxide number appears to be unobjectionable.

It will be noted that Table IV, compared with Tables V and VI, shows a comparison of the effect of using 0.4% $Na_3PO_4$ solubilized in oil by means of sodium sulfonate and 2.0% of the same phosphate finely divided and mixed mechanically with the oils. The results were roughly equivalent. The solubilized phosphate appeared to be slightly inferior on the basis of viscosity increase and neutralization number.

The additional tests made using a base oil of higher viscosity, 675 S.S.U. at 100° F., 80 V.I. (SAE 30 grade) have been referred to in Table VI. The amount of dissolved phosphate, added in a calcium sulfonate was varied from 0 to 0.17% by weight. In all cases about 2% of calcium sulfonate was used. It was noted that as the tri-sodium phosphate content increased from 0 to 0.17%, the amount of naphtha-insoluble material produced in the oven test, described above, dropped sharply from 4.75% for the blank oil to 0 for the oil containing 0.17% of the $Na_3PO_4$. This oil showed less evaporation than the SAE 20 oils tested previously. The increase in viscosity due to oxidation dropped from 32% for the blank oil to 7% for the oil containing 0.17% of phosphate. Color degradation was quite severe in all cases except for the oil containing 0.17% of the tri-sodium phosphate inhibitor.

The oils treated according to the present invention may also contain other conventional additives which are not incompatible with the sodium phosphate, such as viscosity index improvers, pour point depressants, phenol and phenol sulfide type detergents and the like, as will be understood by those skilled in the art.

The present invention is applicable quite generally to substantially anhydrous organic oleaginous materials containing or consisting of constituents which, when subjected to oxidizing influences or conditions, behave as illustrated above for various mineral oils. These materials include hydrocarbon oils of mineral origin, particularly those having a viscosity of at least 30 S.S.U. at 100° F., such as hydrocarbon oils of the heating oil, gas oil, lubricating oil or heavy fuel oil boiling ranges, as well as waxes and asphalts. Certain synthetic hydrocarbon materials derived from various conventional polymerization and/or alkylation processes or from the products of the distillation and/or hydrogenation of carbonaceous solids, the catalytic synthesis of hydrocarbons from carbon monoxide and hydrogen, etc. are likewise included in this group of materials. Substituted hydrocarbonaceous materials, such as oxygen, halogen, nitrogen, sulfur and/or phosphorus derivatives of the above-mentioned materials, including fatty oils and fats, such as lard oil, sperm oil, etc. and their sulfur-containing derivatives, particularly when admixed with mineral oils, may likewise be improved by the salts of the present invention.

If a mineral oil or similar oxidizable oil is contacted at elevated temperatures with the alkaline salts of the invention, the oil-soluble soaps formed in situ have a marked ability to prevent corrosion in the presence of moisture. Much larger quantities of soaps are formed in the case of less highly refined (lower V.I.) oils than with more highly refined products. The less highly refined oils are, therefore, superior as rust preventives.

An extension of this principle involves the use of the generally undesirable components of mineral oils extracted by various solvents, e.g. propane, phenol, furfural, etc. as base materials suitable for reaction with alkaline salts. The reaction products obtained from the resins from propane deasphalting, phenol extract, etc. may be used as concentrates, being added to mineral or similar oxidizable oils in small quantities to impart rust preventive characteristics and extreme pressure properties.

A class of oleaginous materials which may be benefitted by the invention comprises most synthetic oils of lubricating grade, particularly when combined with varying proportions of the mineral oils described above.

Such synthetic lubricating oils may be any of the various synthesized materials having a viscosity of at least 30 S.S.U. at 100° F. A partial list of those synthetic lubricating oils is as follows:

(1) Materials containing recurring alkylene oxide units such as those corresponding to the formula $$RO(C_nH_{2n}O)_xH \qquad (1)$$

wherein R is either an alkyl group or hydrogen, wherein $n$ is a number of from 1 to 5, and wherein $x$ is a number greater than 1, preferably from 2 to 20. Such materials as represented by Formula 1 when R is an alkyl group such as methyl, ethyl, propyl, butyl, amyl and the like, $n$ is 1 to 4 and $x$ is 4 to 18 are especially operable. One commercially available material of this type is represented by Formula 1 when R is a butyl group, $n$ is 3 and $x$ is about 14. Another commercially available material that is useful for the purpose of this invention is represented by Formula 1 when R is hydrogen, when $n$ is 2 and when $x$ is 2 to 10.

(2) Esters of monobasic acids, such as those of the formula $$RCOOR' \qquad (2)$$

wherein R is an alkyl group of from about 4 to about 18 carbon atoms and wherein R' is the same. Either R or R' may be of branched-chain structure. For lubricating characteristics, it is desirable that the total number of carbon atoms in the molecule be between about 20 and 130, preferably 25 to 100. $C_4$ to $C_{18}$ alcohols, such as butyl, isobutyl, hexyl, octyl, iso-octyl, 2-ethyl hexyl, nonyl, decyl, lauryl, stearyl and the like may be reacted with the corresponding acids to prepare esters in accordance with Formula 2.

(3) Esters of dibasic acids, such as those of the formula $$ROOCR''COOR' \qquad (3)$$

wherein R and R' are alkyl groups of from about 4 to about 18 carbon atoms, and wherein R'' is an alkylene group which may contain oxygen or sulfur. Such dibasic acids as those of the formula $$HOOC(CH_2)_xCOOH \qquad (4)$$

wherein $x$ is a number of from 0 to 8 are especially preferred. The $C_4$ to $C_{18}$ alcohols, such as hexyl, octyl, iso-octyl, 2-ethyl hexyl, nonyl, decyl, lauryl, stearyl, and the like, may be reacted with such dibasic acids as adipic, suberic, azelaic, sebacic and the like to form very desirable lubricants.

(4) Esters of glycols, such as those of the formula $$RCOO(C_nH_{2n}O)_xOOCR \qquad (5)$$

wherein R and R' are alkyl groups and wherein $n$ and $x$ are numbers greater than 1. Particularly desirable are the glycol esters according to Formula 5 wherein R and R' are alkyl groups of from 4 to 18 carbon atoms wherein $n$ is 1 to 3, and wherein $x$ is 1 to 20. Esters of the polyethylene glycols and the $C_8$ to $C_{13}$ Oxo acids are especially useful.

(5) Complex esters formed by reacting at least 3 of the following compounds:

(a) Monohydric alcohols
(b) Monobasic acids
(c) Dibasic acids
(d) Glycols (e) Polyhydric alcohols
(f) Polybasic acids where at least one polyfunctional alcohol and at least one polyfunctional acid are employed.

These complex esters may be grouped under the following types:

TYPE I.—MONOBASIC ACID-GLYCOL-DIBASIC ACID-GLYCOL-MONOBASIC ACID

This complex ester may be considered to have the following structural formula:

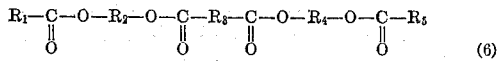
(6)

wherein $R_1$ and $R_5$ are the alkyl radicals of the monobasic acids; $R_2$ and $R_4$ are the alkyl radicals of the glycols, and $R_3$ is the alkyl radical of the dibasic acid.

The esters of this type may be prepared by admixing the calculated amounts of the various compounds and carrying out a straightforward esterification reaction. The reaction conditions are continued with an occasional sample of the product being tested for acidity until the minimum acidity is attained.

TYPE II.—ALCOHOL-DIBASIC ACID-GLYCOL-DIBASIC ACID-ALCOHOL

This ester, especially preferred among all the complex esters, has the following general formula:

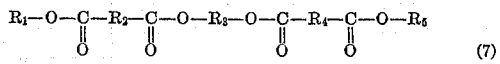
(7)

wherein $R_1$ and $R_5$ are the combining radicals of the alcohol, $R_2$ and $R_4$ are the alkyl radicals of the dibasic acid, and $R_3$ is the alkyl radical of the glycol.

These esters are prepared as those of Type I above but preferably they are prepared by first forming the half-ester of the dibasic acid and the glycol, and subsequently reacting two mols of such half-ester with two mols of the alcohol.

TYPE III.—ALCOHOL-DIBASIC ACID-GLYCOL-MONOBASIC ACID

This ester may be represented by the following formula:

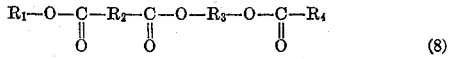
(8)

wherein $R_1$ is the alkyl radical of the alcohol, $R_2$ the alkyl radical of the dibasic acid, $R_3$ the alkyl radical of the glycol, and $R_4$ the alkyl radical of the monobasic acid. This ester may be prepared as described in Type I or it may be prepared by reacting a dibasic acid and a glycol under such conditions that 1 hydroxyl group of the glycol combines with 1 carboxyl group of the dibasic acid, in other words, so that a half-ester is formed. This half-ester is then reacted with a molar proportion each of an aliphatic alcohol and a monobasic acid.

TYPE IV.—MONOBASIC ACID-GLYCOL-DIBASIC ACID-GLYCOL-MONOBASIC ACID

These synthetic complex esters may be said to have the general formula:

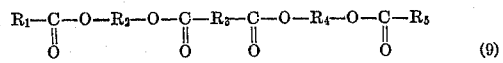
(9)

wherein $R_1$ and $R_5$ are the alkyl radical of the monobasic acid, $R_2$ and $R_4$ are the alkyl radicals of the glycol, and $R_3$ is the alkyl radical of the dibasic acid.

It will be noted that these esters are of the same formula as those appearing above under Type I, except that this type is prepared by reacting a monobasic acid with a glycol under such conditions that a half-ester is formed, and reacting two mols of such ester with one mol of a dibasic acid.

The alcohols used in forming the esters set out above include the following: methyl, ethyl, n-butyl, n-hexyl, n-octyl, 2-ethylhexyl, cetyl, oleyl, the ether alcohols formed by the reaction of ethylene oxide or propylene oxide with aliphatic alcohols, etc. One especially suitable group of alcohols are the Oxo alcohols prepared by the known process of reacting olefins containing 1 carbon atom less than the desired alcohol, with CO and $H_2$ in the presence of group VIII metal catalysts, particularly cobalt catalyst, at temperatures of about 300° to 400° F. and pressures of about 2,500 to 4,000 p.s.i.g., followed by the catalytic hydrogenation of the aldehyde so formed.

Among the monobasic acids which may be employed in the preparation of the complex esters the following may be listed as illustrative: acetic, propionic, butyric, valeric, capric, caprylic, pelargonic, lauric, palmitic, stearic, oleic, beta-methoxypropionic, beta-ethoxypropionic, beta-tert.-octoxypropionic, beta-ethylmercaptopropionic, beta-tert.-octylmercaptopropionic, beta-tert.-dodecylmercaptopropionic acid, and any of the various Oxo acids.

The glycols employed in preparing the complex esters referred to include ethylene glycol and any of the paraffinic homologues of the same containing up to about 18 carbon atoms. These may include, for example, ethylene glycol, propylene glycol, butylene glycol, pinacone, trimethylene glycol, tetramethylene glycol, pentamethylene glycol and the like. Since the glycols may also contain oxygen or sulfur atoms, compounds such as diethylene glycol, triethylene glycol and the polyethylene glycols of the formula $$HO(CH_2CH_2O)_nCH_2CH_2OH \qquad (10)$$

wherein $n$ is 1 to 26, may be used. Glycols containing sulfur atoms in thio-ether linkages include such compounds as thiodiglycol and 1,2-bis(2-hydroxyethylmercapto)ethane. There also may be used glycols containing both oxygen and sulfur in similar linkages; such a compound is bis-2-(2-hydroxyethoxy)ethyl sulfide.

An excellent oil is an ester of Type II, for instance, one that is prepared by reacting two mols of a branched-chain alcohol of from 6 to 10 carbon atoms with two mols of a half ester of a dibasic acid, such as succinic, glutaric, adipic, pimelic, suberic, azelaic, or sebacic acid, and one mol of a glycol such as polyethylene glycol. Specifically preferred is the reaction product according to the above procedure of 2-ethylhexanol, adipic or sebacic acid, and a polyethylene glycol of a molecular weight of about 200.

(6) Materials containing at least one inorganic element:

(a) Esters of phosphoric acid according to the formula

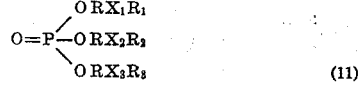
(11)

wherein R represents a saturated aliphatic hydrocarbon group of 2 to 3 carbon atoms; $X_1$, $X_2$ and $X_3$ each represent oxygen or sulfur; and $R_1$, $R_2$ and $R_3$ each represent an organic group which may be an alkyl group, containing from 1 to 18 carbon atoms, or a series of saturated aliphatic hydrocarbon groups, straight chain or branched, interlinked by oxygen or sulfur atoms, the total number of carbon, oxygen and sulfur atoms being from 4 to 18. The maximum number of oxygen or sulfur atoms or both in a given radical is not greater than 5 and there is a chain of at least two carbon atoms between the atom $X_1$, $X_2$ or $X_3$ and the first oxygen or sulfur atom in such radical and a similar chain of at least two carbon atoms between each other pair of oxygen or sulfur atoms in the radical. The more preferred compounds are those in which $X_1$, $X_2$ and $X_3$ represent the same oxygen or sulfur atom and $R_1$, $R_2$ and $R_3$ represent the same organic radical. Preferred compounds are prepared by contacting three mols of an ether or thioether alcohol with one molecular proportion of phosphorous oxychloride. The ether alcohols known to the art as the Dowanols, the Carbitols and the Cellosolves are especially operable.

(b) Halocarbon oils, such as polymers having the formula

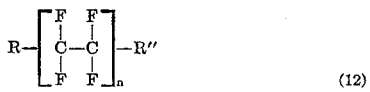  (12)

wherein R and R' are selected from the group consisting of Cl, F and CF$_2$Cl and $n$ is an integer between about 4 and 12. Especially desirable are the polymers of chlorotrifluoroethylene.

(c) Organo-siloxanes, such as those materials having the formulae

  (13a)
  (13b)
  (13c)

wherein R is an alkyl group of from 4 to 26 carbon atoms, wherein $n$ is a number greater than 1 and wherein X is oxygen or sulfur. Exemplary among the preferred organo-siloxanes are the linear methyl polysiloxanes, the linear ethyl polysiloxanes, methylphenyl polysiloxane, ethylphenyl polysiloxane, hexaisodecosy disiloxane and the like. Preferred materials are the linear methyl polysiloxanes wherein $n$ of the formula is between about 6 and 10.

(d) Sulfite esters of the formula

  (14)

wherein A and B are organic radicals, the total number of carbon atoms in A plus B being between 20 and 130. Particularly desirable are the sulfite esters of alcohols containing ether or thioether linkages.

(7) Organic carbonates having the formula

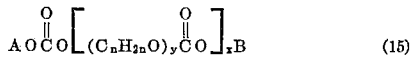  (15)

wherein A and B represent organic hydroxyl containing materials less the hydroxyl group, such as alcohol residues, wherein $x$ and $y$ and $n$ represent numbers of the value of 1 or more. Preferred compounds are represented by the formula when A and B are the residues of branched-chain alcohols containing from 6 to 20 carbon atoms, wherein $n$ is 2, wherein $y$ is 4 and wherein $x$ is 2. Particularly desirable oils are prepared by reacting C$_8$ to C$_{13}$ Oxo alcohols with ethyl carbonate to form the half ester and reacting this half ester with a polyethylene glycol.

(8) Mercaptals of the formula

  (16)

wherein X is oxygen or sulfur, $y$ is an integer of from 1 to 10, and where A and B are organic radicals, such as the residue of alcohols, ethers and the like. Mercaptals formed by reacting C$_8$ to C$_{18}$ branched-chain mercaptans with formaldehyde are especially preferred, such as 2-ethyl hexyl mercaptan and the like.

(9) Formals of the formulae

  (17a)
  (17b)
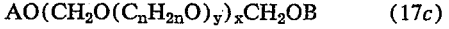  (17c)

wherein A and B represent organic radicals corresponding to organic compounds containing at least one hydroxyl group that is alcoholic in nature less the hydroxyl group, and contain from 1 to 60 carbon atoms, wherein $x$, $n$ and $y$ are integers having the value of 1 or more, $n$ being 2 or greater. The total number of carbon atoms in the molecule should be between 20 and 130, preferably 25 to 100. Particularly desirable are the formals of C$_8$ to C$_{18}$ branched-chain alcohols and complex formals wherein $n$ is 2 and $y$ is 4 or more.

Grease thickeners useful for the preparation of greases in accordance with the present invention include all materials which are capable of thickening lubricating oils to a grease consistency and which will not chemically react with the inhibitor salt added in accordance with the invention. One group of suitable grease thickeners comprises the sodium, potassium or mixed sodium-calcium soaps of conventional fatty acids, such as stearic, oleic, palmitic or other fatty acids having 12–30 carbon atoms as well as substituted acids, such as the hydroxy, polyhydroxy, keto, alkyl and alkoxy derivatives of such fatty acids. Various metal salts of low molecular weight carboxylic acids having 1–5 carbon atoms, such as sodium or calcium acetate or crotonate may be combined with these soaps in various proportions in a manner known per se.

Certain organic materials having grease thickening characteristics, such as carbon black, cellulose, various cellulose derivatives, etc., may be used. Another group of suitable grease thickeners is composed of inorganic materials having grease-forming properties, such as silica gel, amorphous silica, bentonitic and attapulgite clays, and conventional modifications thereof such as bentonites modified by quarternary ammonium bases, Attapulgus clay modified by small amounts of surface active agents; calcium silicate, etc. These inorganic thickeners may contain water-proofing agents, such as various silicone oils, sodium methyl siliconate, chloromethyl silane; resins, such as alkyd resins; C$_2$ to C$_{18}$ primary or secondary alcohols; etc., which do not react with the salt inhibitor used.

Various alkaline salts were tested in soap-thickened greases, as indicated above in connection with oils. Sodium carbonate was one of the first used and it proved to be ineffective.

The various sodium phosphates and silicates have been found to be particularly useful as oxidation inhibitors for sodium soap greases. Other salts such as sodium acetate, sodium furoate and sodium benzoate—all of which have considerably less total alkali than the others mentioned—have only a limited, if any, usefulness.

Formulae and inspections of these greases are shown in Table VIII. They were all prepared using the same mineral oil (phenol treated Tia Juana distillate, 675 S.S.U. viscosity at 100° F., 80 V.I.) and the same fatty acid (12-hydroxy stearic acid). All contain 1% phenyl alpha naphthylamine and a small quantity of sodium petroleum sulfonate as a dispersing agent for the soap.

These greases were tested for oxidation resistance by a test which consists of packing an anti-friction bearing with 5 g. grease and subjecting it to an oven temperature of 300° F. for a prolonged period until the grease hardens to a micropenetration of 5. In tests of this character, it has been found that there is a reasonably direct relation between the life (hours duration of test) on the test spindle at 300° F. and the time required for the same grease to harden to such a degree that it reaches a micropenetration of 5 in a static test in an oven at the same temperature. Hence, by means of a simple static micropenetration test, it has been found possible to evaluate a large number of additives for improving oxidation resistance of anti-friction bearing greases, with a reasonable expenditure of time, effort and materials. Such test procedure may be designated "The Grease Hardening Test." The time in hours required for hardening to a micropenetration of 5 has been designated as the "The Grease Hardening Test Life" and for the greases here involved is a reasonably reliable indication of bearing performance at high temperatures.

The salts used were analyzed for total alkalinity as previously described. The results are shown in Table VII.

TABLE VII
Analysis of various salts for total alkalinity

| Salt | Chemical formula | Na₂O (theor.) percent | Na₂O (found) percent [1] |
|---|---|---|---|
| Sodium carbonate | $Na_2CO_3$ | 58.5 | 55.0 |
| Sodium furoate [2] | $NaC_5H_3O_3$ | | 0.1 |
| Sodium acetate | $NaC_2H_3O_2$ | | 1.5 |
| Sodium benzoate | $NaC_7H_5O_2$ | | 0.5 |
| Sodium tetraborate | $Na_2B_4O_7.5H_2O$ | 21.3 | 21.6 |
| Trisodium phosphate | $Na_3PO_4$ | 37.7 | 36.4 |
| Disodium phosphate | $Na_2HPO_4$ | 21.9 | 21.8 |
| Sodium ortho silicate [3] | $Na_4SiO_4$ | 67.5 | 56.2 |
| Sodium sesqui silicate | $Na_6Si_2O_7.5H_2O$ | 37.0 | 36.4 |
| Sodium meta silicate | $Na_2SiO_3.5H_2O$ | 29.2 | 29.7 |

[1] By titration with standard acid using methyl orange as indicator (ASTM method D-501-49).
[2] Prepared by reaction of furoic acid and sodium hydroxide in anhydrous methanol solution.
[3] This salt is hygroscopic and undoubtedly contained traces of water.

The total alkalinity of each grease was then calculated and plotted against grease hardening test life. It will be observed that some correlation, though not a well defined one, exists between these two factors. The greases containing relatively large amounts of total alkali—the silicates and phosphates—have a life exceeding 1900 hours, whereas those containing little or no alkali (acetate, furoate and benzoate) fall between 700–1020 hours. The most notable exception is the grease containing sodium carbonate which has 2.2% total alkali but a grease hardening test life of only 800 hours. As indicated before, this may explain why excess alkali, as sodium hydroxide, does not have the same beneficial effect as an alkaline salt. As is well known, excess sodium hydroxide in greases is rapidly converted into sodium carbonate. To illustrate this point, a grease was prepared of the same general formula as shown in Table VIII below (25% 12-hydroxy stearic acid, 1% sodium petroleum sulfonate and 1% phenyl alpha-naphthylamine) but containing 2.5% excess alkali as NaOH. It was found that after less than 100 hours on the grease hardening test at 300° F. the hydroxide had been entirely converted to carbonate. This grease had a grease hardening test life of 520 hours. Results with various salts are indicated in this table.

On the basis of grease hardening test life, the greases shown in Table VIII fall roughly into three groups, as follows:

Group 1: Those having a grease hardening test life of 520–1,020 hours. These include:
 (a) The blank grease,
 (b) Greases containing low-alkali salts (furoate, acetate and benzoate),
 (c) Greases containing sodium carbonate, sodium borate and sodium hydroxide (excess).

Group 2: Those having a grease hardening test life of 1,900–2,700 hours. These include the greases containing the three sodium silicates and tri-sodium phosphate.

Group 3: Those of intermediate life, viz., 1,020–1,900 hours. The grease containing tri-sodium phosphate added as a dry powder is in this class. The lower life for this grease might be expected since the optimum dispersion of the salt is not attained when the salt is added as a dry powder. The grease containing disodium phosphate is also in this group.

Although the data indicate a broad trend towards longer life with higher total alkalinity, the exceptions noted previously (carbonate and borate) reveal a large discrepancy. It is possible that other factors at present unknown may also be of some importance. It is probable that there are significant differences in the type of reaction occurring between the various salts and the mineral oil, as indicated above.

It has been suggested in the prior art that it is advantageous to combine with conventional soaps certain low molecular weight salts to improve certain properties of lubricating greases. The exact mechanism is not too clearly understood but it is believed that, in some cases, the low molecular weight salts which are used form complexes with common fatty acid soaps. Such complexes appear to have improved thickening or bodying effect in lubricating oils.

According to a specific embodiment of the present invention, the use of the alkali metal salts herein described, especially the sodium phosphates, with specific soaps gives improved results which are disproportionate to the

TABLE VIII
Formulae and inspections of greases containing alkaline salts

| Composition g. per 100 g. grease | T-7 (blank) | T-121 | T-126 | T-130 | T-128 | T-129 | K-2358-C |
|---|---|---|---|---|---|---|---|
| 12-hydroxy stearic acid | 15 | 15 | 15 | 15 | 15 | 15 | 18. |
| Sodium sulfonate (Acto 630) | 1.5 | 1.8 | 1.8 | 1.5 | 1.5 | 1.5 | 1.4. |
| Phenyl α naphthylamine | 1 | 1 | 1 | 1 | 1 | 1 | 1. |
| Alkaline salt | Nil | 4 ($Na_2CO_3$) | 4 (sodium furoate). | 4 (sodium[2] acetate). | 4 (sodium[2] benzoate). | 4 (sodium[2] tetraborate). | 3.8 (trisodium phosphate hydrate). |
| Inspections: | | | | | | | |
| ASTM worked penetration | 325 | 284 | 405 | 325 | 325 | 325 | 252. |
| Total alkalinity ($Na_2O$, percent) of grease [3] | Nil | 2.2 | 0.005 | 0.06 | 0.02 | 0.86 | 1.38. |
| G.H. test life, hours [4] | 725 | 800 | 800 | 910 | 960 | 1,020 | 1,950. |

| Composition g. per 100 g. grease | T-131 | K-2389 | P-2204 | P-2203 | P-2168 | P-2199 | P-2196 | P-2196SK | K-2435 |
|---|---|---|---|---|---|---|---|---|---|
| 12-hydroxy stearic acid | 15 | 15 | 16 | 18 | 25 | 16.5 | 18 | 24 | 14.5. |
| Sodium sulfonate (Acto 630) | 1.5 | 1.5 | 1.6 | 1.8 | 2.5 | 1.7 | 1.9 | 2.4 | 1.5. |
| Phenyl α naphthylamine | 1 | 1 | 1 | 1 | 1 | 1 | 1 | 1 | 1. |
| Alkaline salt | 4 (trisodium[2] phosphate hydrate). | 2.45 (sodium ortho-silicate). | 1.4 (sodium ortho-silicate). | 1.7 (sodium ortho-silicate). | 4 (sodium ortho-silicate). | 7.0 (sodium meta silicate). | 6.3 (sodium sesqui silicate). | 8.1 (sodium sesqui silicate). | 3.7 (disodium phosphate.) |
| Inspections: | | | | | | | | | |
| ASTM worked penetration | 325 | 260 | 277 | 310 | 295 | 280 | 290 | 290 | 270. |
| Total alkalinity ($Na_2O$, percent) of grease [3] | 1.45 | 1.37 | 0.79 | 0.96 | 2.25 | 2.08 | 2.30 | 2.95 | 0.82. |
| G.H. test life, hours [4] | 1,450 | 1,940 | 1,900 | 1,990 | 2,200 | 1,920 | 2,560 | 2,700 | 1,240. |

[1] All greases prepared with a phenol treated Tia Juana distillate, 675 S.S.U. Visc. at 100° F., 80 V.I. Sufficient NaOH used to neutralize the fatty acids, yielding an approximately neutral soap.
[2] Salt added in form of dry powder to finished grease. Attempts to incorporate acetate, benzoate and tetraborate as complex with soap yielded fluid products.
[3] Calculated from values shown in Table VII for each salt.
[4] Time required for grease to reach a micropenetration of 5.

small quantities of salts used. The data appear to indicate that other phenomena than the formation of a complex are also involved and the products have unexpected and remarkably good lubricating properties over a wide temperature range.

In many prior art greases, certain soaps and complexes have been found to be relatively incompatible with oils of high viscosity index. As a result, these lubricating greases usually have been prepared with oils of lower viscosity index. As a matter of fact, it is almost universal practice in grease manufacture to use lubricating oils of viscosity index as low as 40 to 50 to avoid this difficulty.

One aspect of the present invention is the discovery that lubricating oils of high viscosity index, for example, of viscosity index at least as high as 80 and preferably as high as about 90 to 100 or more, may be used to prepare very satisfactory grease type lubricants. According to this aspect of the present invention, therefore, the superior lubricating qualities over wider temperature ranges of the high viscosity index oils may be advantageously utilized in greases. This is frequently of considerable importance. By obtaining a good stable grease structure with high viscosity index oils, greases having good high temperature properties, good low temperature properties and advantageous physical structure for various types of operations may be obtained. The products of the present invention have shown exceptionally good performance, for example, in the high speed, high temperature spindle tests. They have shown spindle life of 1000 to 1500 hours or more at 10,000 r.p.m. and 300° F., as compared with only a small fraction of such life for analogous products in the prior art. At the same time, the ingredients used are not expensive and their processing is comparatively easy and simple.

As pointed out above, oxidation resistance of greases may be improved substantially by the addition of the alkali metal salts of the invention, particularly di- and tri-sodium phosphate and the silicates. The straight unsubstituted phosphates, especially tri-sodium phosphate, are preferred for this purpose. Sodium base greases, and particularly those including soaps of hydroxy acids, e.g. of hydroxy stearic acid, may be given greatly improved resistance to oxidation. Other desirable properties, e.g., improved soap dispersion or thickening effect are secured also without adversely affecting other properties of the greases. The action of the sodium and potassium salts is quite specific. Lithium compounds are much less satisfactory. The choice of soaps, for best results, also is quite specific.

It has been observed that when conventional soap greases, prepared from oleic and/or stearic acid, are modified with sodium phosphate to improve their high temperature oxidation characteristics, they undergo a change in phase at temperatures varying from 150° to 275° F. The phase change at the lower end of this range is particularly objectionable. Because of this, the sodium phosphate greases become much harder in consistency on cooling and are, therefore, less desirable as lubricants. A further feature of the present invention involves the discovery that this tendency of sodium phosphate greases to harden excessively due to phase change at low temperature can be greatly reduced by using hydroxy acids, e.g., hydroxy stearic acid, as at least a part of the soap stock. Preferably, the hydroxy stearic acid forms at least half of the soap but lower proportions have some advantage.

In order to evaluate this hardening tendency, a test procedure described below was applied to (a) conventional soda greases, (b) conventional soda-soap greases containing tri-sodium phosphate, and (c) sodium 12-hydroxy stearate greases containing tri-sodium phosphate.

The experimental procedure was to fill a brass cylinder 2½ inches long and ⅜ inch in diameter and thread it into a brass base which held it in upright position. A micropenetration, as described in the Institute Spokesman, October 1947, page 6, was taken on each sample and the cylinder was then placed in an oven at the selected test temperature for one hour. Thereafter the cylinder was removed, permitted to cool to room temperature, and another micro penetration was taken on the cooled grease. Results are shown in Table IX.

TABLE IX

| Example | Soda-soap stock | Na₃PO₄, percent by weight | Vis. of oil, S.S.U. at 100° F. | V.I. | Temp., °F. for 25% drop in micro penetration |
|---|---|---|---|---|---|
| A | Rapeseed oil | 0 | 300 | 45 | 260 |
| B | Stearic acid | 0 | 320 | 45 | 255 |
| C | do | 0 | 500 | 45 | 220 |
| D | do | 3.9 | 320 | 45 | 160 |
| E | do | 1.75 | 500 | 45 | 190 |
| F | do | 2.9 | 500 | 45 | Below 150 |
| G | do | 2.3 | 500 | 45 | 185 |
| H | 12-hydroxy stearic acid | 3.0 | 500 | 45 | 295 |
| J | do | 4.5 | 500 | 45 | 280 |

Various samples were heated to various temperatures, 150° to 300° F., heating being maintained for an hour at a selected temperature in each instance. Thereafter the samples were cooled to room temperature and the heating temperature at which a phase change took place, as indicated by a hardening of 25% or more upon cooling, was recorded in the last column of Table IX. Examples H and J were outstanding.

Based on the above data, additional samples were prepared, as indicated below:

EXAMPLES K, L

| Composition | K | L |
|---|---|---|
| 12-hydroxy stearic acid, percent by weight | 11.4 | 18.2 |
| Sodium sulfonate, oil soluble (65:35 conc.) | 1.2 | 1.6 |
| NaOH (dry) | 1.5 | 2.3 |
| Lime | 0.4 | 0 |
| Na₃PO₄ | 1.2 | 3.9 |
| Mineral oil | ¹ 83.8 | ² 73.0 |
| Phenyl alpha naphthylamine | 0.5 | 1.0 |

¹ A blend of 36.9% of vis. 100 (S.S.U. at 100° F.), 45 V.I. and 45.5% 300 S.S.U., 75 V.I.
² 675 S.S.U. vis. at 210° F., V.I.=80.

The sodium sulfonate was used to disperse the sodium phosphate. Example K is designed for general purpose anti-friction bearing lubrication: Example L is designed for extremely high temperature service. In both cases, the greases were prepared by adding the soap stock to part of the mineral oil, adding an aqueous solution of NaOH and cooking to a temperature between 275° and 325° F., preferably about 300° F. The trisodium phosphate is added preferably after the soap is formed.

These products were found to be very stable against oxidation and they have shown good performance in the high speed spindle test.

EXAMPLE M

A grease was prepared as in Examples K and L by using 22 parts by weight of stearic acid, 69.6 parts of a pale mineral oil having a viscosity of 320 S.S.U. at 100° F., and a viscosity index of 45. 4.5 parts of sodium hydroxide (dry weight) were added in the form of an aqueous solution and 9.1 parts of hydrated tri-sodium phosphate (Na₃PO₄.12H₂O) or about 3.9 parts, on the basis of anhydrous salt, were added and the grease was cooked as above to first form the soap and then to evaporate the water and dehydrate or substantially dehydrate the sodium phosphate. This product showed a very satisfactory stability to oxidation and it gave exceptionally long performance in the high speed spindle test.

The standard high speed spindle test used for evaluating the high temperature properties of greases is the method published by the ABEC and the NLGI. It consists of rotating a Norma Hoffman 204 ball bearing at 10,000 r.p.m., maintained at a temperature of 300° F. until the bearing fails. Conventional sodium soap greases soon turn dark and become very hard in this test. This deterioration is due to three main factors: oxidation of the grease, evaporation of the mineral oil component of the grease and leakage of oil from the bearing due to bleeding.

As suggested above, in order to obtain optimum performance at high temperatures using mineral oils, it is desirable to employ highly refined oils since they possess the greatest stability towards oxidation at high temperatures, they have low volatility, and they have high viscosity index. It is also essential, for optimum performance, that the oxidation of the grease be further controlled by the use of effective oxidation inhibitors. The addition of the inhibitor salts of the present invention acts not only as a powerful oxidation inhibitor but it also greatly reduces the amount of oil separation (bleeding) at high temperatures. This makes possible the manufacture of sodium soap greases with high viscosity index lubricating oils.

Table X below shows the formulas and inspections of several high temperature greases. Grease N is a conventional prior art sodium base grease. Grease O is the same as N except that it contains 0.4% of $Na_3PO_4$ (anhydrous salt). It will be noted that the base grease N showed a spindle life of 288 hours. Grease M showed a spindle life of 480 hours and the micro penetration or grease hardening tests gave ratings of 290 and 520 hours, respectively.

The grease of Example M employed a conventional oil of moderately low viscosity index. Grease P was prepared with an oil of 500 S.S.U. viscosity at 100° F., this oil having a viscosity index of about 45. Grease P contained 3.7% of $Na_3PO_4$ (calculated as anhydrous salt) and 1% of phenyl alpha naphthylamine as an added oxidation inhibitor. The combination of tri-sodium phosphate and the phenyl alpha-naphthylamine proved to give excellent oxidation resistance as shown in the micro penetration test. This product also gave a high speed spindle life of 1140 hours, which is exceptional performance.

Grease Q, shown in Table X below, was prepared with a 500 S.S.U. viscosity at 100° F., 80 V.I. mineral oil. It contained 2% of anhydrous tri-sodium phosphate and 1% phenyl alpha-naphthylamine as oxidation inhibitors. This product had an extremely long spindle life of 1520 hours. The data on grease R, Table X, indicate that the utility of the sodium phosphate in oils of viscosity index as high as 95 is very satisfactory. Good correlation was obtained between the spindle test and the micro penetration hardening test mentioned above for the several greases on which data were obtained.

A preferred method of grease preparation consists in first heating the fatty acid together with an equal quantity of mineral oil to about 200° F. in a suitable grease kettle. For good temperature control, a steam jacketed kettle is preferred. Caustic soda is added, preferably as an approximately 50 Bé. solution, and the soap stock is then dehydrated by further heating. This product is further heated to about 300° F., the phosphate solution is added and finally the additional mineral oil is added at a temperature of about 300° F. At this point, other additives may be added, if desired. Then the material is cooled with continued stirring to about 200° F. On reaching the cooling temperature, the grease can be poured directly into commercial package containers. Conventional grease making equipment, particularly a steam kettle equipped with stirrers, is quite satisfactory.

TABLE X

Formula and inspections for high temperature greases

|  | M | N | O | P | Q | R |
|---|---|---|---|---|---|---|
| Formula percent by weight: |  |  |  |  |  |  |
| Stearic acid | 22.0 | 17.0 | 22.5 | 19.5 | 20.5 | 21.8 |
| Sodium hydroxide | 4.5 | 3.1 | 4.6 | 4.0 | 3.9 | 4.2 |
| Trisodium phosphate [1] | 3.9 |  | 0.4 | 3.7 | 2.0 | 2.5 |
| Mineral oil (V/100-320, V.I. 45) | 69.6 | 79.9 | 72.5 |  |  |  |
| Mineral oil (V/210-85, V.I. 45) |  |  |  | 43.6 |  |  |
| Mineral oil (V/100-290, V.I. 80) |  |  |  | 28.2 |  |  |
| Mineral oil (V/100-675, V.I. 80) |  |  |  |  | 29.1 |  |
| Mineral oil (V/100-150, V.I. 95) |  |  |  |  | 43.5 |  |
| Mineral oil (V/100-550, V.I. 95) |  |  |  |  |  | 7.0 |
|  |  |  |  |  |  | 63.5 |
| Phenyl alpha naphthylamine |  |  |  | 1.0 | 1.0 | 1.0 |
| Inspections: |  |  |  |  |  |  |
| Viscosity of mineral oil at 100° F | 320 | 320 | 320 | 500 | 500 | 500 |
| Free Alkali percent | 0.8 | 0.15 | 0.35 | 0.6 | 0.8 | 0.9 |
| Bleeding at 300° F. (percent oil loss[2]) | 1.7 | 25.2 |  | 3.7 | 8.7 | 10.7 |
| ASTM dropping point °F | 432 | 393 | 415 | 430 | 430 |  |
| Worked penetration at 77° F | 300 | 300 | 305 | 290 | 275 | 270 |
| Resistance to working (penetration after 10,000 strokes[3]) |  | 335 |  | 265 | 327 | 338 |
| Grease hardening test at 300° F.: |  |  |  |  |  |  |
| Hours to 5 micro penetration | 520 | 290 | 390 | 1,160 | 1,550 | 1,030 |
| Color of grease at end of test | Yellow | Black | Brown | Red-brown | Dk. brown | Dk. brown |
| Spindle test (10,000 r.p.m. and 300° F.) hours | 480 | 288 | No data | 1,140 | 1,520 | 1,090 |

[1] Expressed as anhydrous salt ($Na_3PO_4$).
[2] 185 grams of grease in a 28 mesh galvanized cone for 100 hours at 300° F.
[3] Conducted at 2500 sec-1 rate of shear.

Referring in greater detail to the effect of the presence of phosphate on the bleeding characteristics of greases at high temperature, in Table X it will be seen that grease N ("blank") shows 25.2% bleeding at 300° F., greases M and P which contain 3.9 and 3.7% of sodium phosphate show only 1.7 and 3.7% bleeding. These data indicate that the presence of the sodium phosphate has improved the structure of the grease with a resulting decrease in the bleeding of oil at high temperatures.

The effect of increasing the amount of tri-sodium phosphate on the rate of oxidation as indicated by the grease hardening test is shown in Table XI. Four greases were prepared from sodium stearate dispersed in a mineral oil of 500 S.S.U. viscosity at 100° F. and about 80 viscosity index. All contained 1% phenyl alpha-naphthylamine.

TABLE XI

Effect of phosphate content on oxidation rate of greases [1]

| Laboratory designation | S (blank) | T | U | V |
|---|---|---|---|---|
| Tri-sodium phosphate, percent by weight | Nil | 1.0 | 2.0 | 4.0 |
| Results of grease hardening test: Hours to 5 micro penetration | 700 | 975 | 1,550 | 2,150 |

[1] Greases contain approximately 20% sodium stearate dispersed in mineral oil (V/100° F. 500, V.I. 80).

When the above data were plotted on graph paper, it was observed that the number of hours required for the grease to reach a micro penetration of 5 increased practically linearly with increasing percentage of sodium phosphate added, from 700 hours in the case of grease S (the blank) to 2150 hours in the case of grease V.

Table XII shows still additional examples where various phosphate type salts were added in various proportions. These greases were subjected to the micro penetration test which, as indicated above, appears to be a good indicator of oxidation at high temperature. The blank grease N was the same as in Table X. It will be noted that greases W, X and Y showed good resistance, especially the latter two. Grease Z containing sodium hypophosphite showed poorer performance than the blank or untreated conventional grease.

sodium phosphate. The proportions of phosphate varied from about 0.5 to 1 equivalent (0.167 to 0.333 mol) of phosphate per mol of soap. The evident formation of a salt-soap complex appears to account for the enhanced thickening power or "yield."

At 3.4% of tri-sodium phosphate or higher, the salt was in molar excess over the soap and the yield decreased.

It will be noted that grease F-1 showed an O.K. load on the Timken extreme pressure testing machine of 33 which approaches the standard extreme pressure lubricants, e.g. lead naphthenate greases run from 33 to 43 lbs. O.K. load. Example R, described above, contained 2.5% $Na_3PO_4$ and carried 25 lbs. O.K. load. Ordinary soda base greases fail at 15 lbs., on the Timken machine.

One further test was made to determine whether the thiophosphate analogs of $Na_3PO_4$ are equally useful.

EXAMPLE G-1

A sodium stearate grease (about 20% soap in oil of SAE 20 base, 320 S.S.U. at 100° F., 45 V.I.) was prepared as in Examples N, W, X, Y, Z (see Table XII) except that it contained 3.8% $Na_3PS_4$. The latter salt was prepared by reacting $Na_2S$ with $P_2S_5$ as described by Mellor, vol. 8, page 1064. The resulting salt was dissolved in hot water and incorporated into the soap, the water being subsequently evaporated. After 200 hours in the hardening test (Table XII) the grease was

TABLE XII

Results of grease hardening tests

| Laboratory designation | N (blank) | W | X | Y | Z |
|---|---|---|---|---|---|
| Type of added salt | | Sodium di-hydrogen phosphate ($NaH_2PO_4$). | Di-sodium hydrogen phosphate ($Na_2HPO_4$). | Sodium pyrophosphate ($Na_4P_2O_7$). | Sodium hypophosphite ($NaH_2PO_2$). |
| Percent added salt | | 2.7 | 3.7 | 6.6 | 2.7. |
| Results of grease hardening test: [2] | | | | | |
| Hours to 5 micro pen | 290 | 430 | 530 | 520 | 200. |
| Color of grease at end of test | Black | Black | Brown | Brown | Black. |

[1] Base greases to which the inorganic salts were added consisted of 20-25% sodium stearate dispersed in an SAE 20 Base (V/100-320, V.I. 45).
[2] 5.00 gms. grease was packed into a Norma Hoffman 204 ball bearing and the bearing was suspended by a wire hook in an oven at 300° F. At time intervals varying between 75-150 hours, the bearing was removed from the oven and allowed to cool to room temperature. The micro penetration of the grease was taken, the grease was then repacked in the bearing and the test repeated until the micro penetration of the grease dropped to a value of 5.

The yield of grease, i.e., the production of a desired consistency with a minimum quantity of thickener, is considerably improved by the present invention. Greases prepared by this method also have superior extreme pressure properties.

A series of greases were prepared from 12-hydroxy stearic acid and an SAE 30 base mineral oil of about 675 S.S.U. viscosity at 100° F., viscosity index about 80. Various quantities of tri-sodium phosphate were used, from 0 to 3.5%. Results are shown in Table XIII.

completely black and had hardened to a micro penetration of 5. It was not satisfactory.

Optimum quantities of the phosphate salt in the examples last reported appear to be about 2 to 4% on an anhydrous salt basis. The hydrated salt may be used in proportions of about 2 to 20%. Somewhat smaller lower limits, as little for example as 0.5%, and upper limits to about 10%, of the anhydrous salt may be used with beneficial results.

Although the straight soda base greases are preferred

TABLE XIII

| Designation | A-1 | B-1 | C-1 | D-1 | E-1 | F-1 |
|---|---|---|---|---|---|---|
| Formula, percent by weight: | | | | | | |
| 12-OH stearic acid | 15.0 | 15.0 | 15.0 | 15.0 | 15.0 | 15.0. |
| Sodium sulfonate 65:35 | 1.5 | 1.5 | 1.5 | 1.5 | 1.5 | 1.5. |
| Sodium hydroxide (dry) | 1.9 | 1.9 | 1.9 | 1.9 | 1.9 | 1.9. |
| $Na_3PO_4$ | | 1.3 | 1.8 | 2.55 | 3.4 | 3.6. |
| SAE 30 base oil | 81.6 | 80.3 | 79.8 | 79.05 | 78.2 | 78.0. |
| Inspections: | | | | | | |
| Free alk. (on soap) percent | 0.03 | 0.04 | 0.06 | 0.03 | Neut. | Neut. |
| ASTM Wkd. Pen. at 77° F | 324 | 245 | 269 | 259 | 325 | 337. |
| Timken test load, lbs | 15 fail | (1) | (1) | (1) | (1) | 33 O.K., 38 fail. |

[1] Not determined.

In Examples A-1 to F-1, inclusive, all variables except the sodium phosphate were kept constant, including the method of manufacture. It will be noted that the yield was best for proportions of 1.3 to 2.55% of trifor high temperature anti-friction bearing service, the soaps of other metals, such as potassium or mixed sodium-calcium or potassium-calcium, may be used. The soap content of the grease may vary between about 5 and about 40% of the weight of the grease, 10 to 30% of sodium soap usually being required for anti-friction bearing lubricaton. Soda soaps may be prepared from any of the fatty acids or fatty oils having from about 12 to 24 carbon atoms per acid molecule. The substantially saturated hydroxy acids are especially preferred, however.

As pointed out above, greases thickened with complexes of soaps with sodium or calcium salts of low molecular weight carboxylic acids have been known prior to the present invention. It has been found that the inhibitor salts of the invention may be used advantageously in combination with such complex-thickened greases, particularly those containing sodium salts of low molecular weight carboxylic acids having 1-5 carbon atoms. This is demonstrated in Example XIV below.

EXAMPLE XIV

A grease was prepared by melting the fatty acid in about ⅓ of the total mineral oil used, adding caustic soda as a 50° Be. solution, adding acetic acid, stirring while heating to 400° F., dehydrating at about 400° F. and cooling while adding the balance of the mineral oil. To one portion (B) of the grease batch so prepared anhydrous trisodium phosphate was added during the cooling step. The two grease portions (A and B) were subjected to the grease hardening test. The composition of these greases and the test results are tabulated below.

| | A | B |
|---|---|---|
| Composition, weight, percent: | | |
| Hydrogenated fish oil acids | 4.0 | 3.9 |
| Hydrogenated castor oil | 4.0 | 3.9 |
| Glacial acetic acid | 16.0 | 15.6 |
| NaOH | 11.7 | 11.4 |
| Mineral oil (70 SSU at 210° F.; 70 V.I.) | 64.3 | 64.2 |
| Na₃PO₄ | | 1.0 |

| | Micropenetration | Color |
|---|---|---|
| Test results (after 290 hours at 300° F.): | | |
| Grease A | 52 | Black. |
| Grease B | 60 | Light yellow. |

It will be noted that oxidation as indicated by color change is much less pronounced in grease B containing tri-sodium phosphate.

A specific embodiment of the invention relates to greases suitable for the lubrication of the roller bearings of railroad car journals. Such greases should have the following general characteristics:

(a) Semi-fluid consistency
(b) Resistance to oxidation for long operating periods
(c) Resistance to both emulsification and hardening in the presence of traces of water
(d) Ability to lubricate through wide extremes of temperature In order to satisfy these requirements, such greases are generally compounded of a soda-lime soap (preferably about 10% or less) dispersed in a high V.I. mineral oil, with an oxidation inhibitor added. Such a formulation is conducive to a somewhat unstable dispersion of soap in oil, as shown by relatively high bleeding at moderate temperatures. Car journal greases appear to be unusual in that the best lubrication is obtained under these conditions probably because leakage from the housing is not a serous factor in service. This was demonstrated by a field test carried out on the Canadian Pacific Railway with two greases: (a) an approved product (b) an experimental product. It was observed that grease (a) bled oil freely in the bearings and showed no hardening after 20,000 miles operation, whereas grease (b) which had been found to give much lower bleeding values in laboratory tests, did not bleed oil and hardened considerably in consistency. For these reasons the latter product was not accepted by the railroads. From these data it appears that the lubrication of car journals differs from most other anti-friction bearing applications in that a comparatively unstable grease structure seems to be desirable, whereas generally this cannot be tolerated in anti-friction bearing greases.

In the prior art, conventional fats have been used as the soap stock for these greases, together with conventional oxidation inhibitors which are oil soluble. When it was attempted to improve the oxidation resistance of this type of grease merely by incorporating a small quantity of tri-sodium phosphate as a complex with the soap, it was found that tri-sodium phosphate modified the physical properties of the soap to such an extent that satisfactory car journal greases could not be prepared. The yield was poor (more than 15% soap being required for the desired consistency) and the grease structure was fibrous and elastic, which rendered it unsuitable for the special purpose of car journal lubrication.

According to this specific embodiment of the present invention, these objections can be overcome as follows: A fat (e.g. tallow) in about an equal weight of low V.I. mineral oil is saponified with a slight excess of sodium hydroxide to give the usual sponge-like "soap." This soap is dehydrated at 300° F., an aqueous solution of tri-sodium phosphate is added, and the complex is again dehydrated, becoming extremely fibrous and plastic in texture. A small quantity of calcium acetate in aqueous solution is added, the mix is dehydrated at 300° F. and cut back with oil to the desired consistency. The presence of the calcium salt of the low molecular weight fatty acid destroys most of the fibre of the grease and also improves the yield (consistency of 360 for a soap content of approximately 8%). The overall properties of this type of grease appear satisfactory, as shown in Table XV below.

Table XV shows a set of railroad specifications and those of a bearing manufacturer for this type of grease together with inspections of a product which is approved for this service. Inspections of the experimental grease are shown under the heading "New Product." It will be observed that there is no perfect agreement as to what constitutes a suitable car journal grease. At least two of the requirements, viz. bleeding test A which is carried out at 210° F., and A.S.T.M. dropping point, do not appear to be too realistic in evaluating these greases inasmuch as bearing temperatures in service rarely exceed 150° F.

Several other laboratory tests were, therefore, included such as bleeding test B, water resistance and the hardening tests, all of which were carried out at 125°–130° F., a good average running temperature for car journal bearings. It has been found that these tests correlate quite well with field test data so far obtained. For example, one product which was found to be unsatisfactory in service hardened from 155 micro peneration to 58–70 micro peneration after 20,000 miles' operation; in the laboratory test it hardened rapidly to a micro penetration of 68. The approved product showed very little hardening in either case. Apparently high humidity is necessary for this hardening to occur with certain types of greases. Addition of water in small proportions to the grease simulates water contamination which may often occur in service. Up to 3% water has been found by analysis of used greases from railroad journal tests.

The novelty of this embodiment of the invention lies in the specific combination of a soda soap, tri-sodium phosphate and calcium acetate, which in the form of a complex acts as a thickening agent for mineral oil and imparts superior yield, texture and oxidation resistance to the resulting grease.

TABLE XV

*Formulae and inspections of car journal greases*

| | Railroad [1] specification | Timken specification | Approved product | New product |
|---|---|---|---|---|
| Formula, percent by weight: | | | | |
| Acidless tallow | | | | 7.2. |
| Sodium hydroxide (dry) | | | | 1.1. |
| Trisodium phosphate | | | | 0.85. |
| Calcium acetate | | | | 0.85. |
| Mineral oil (100 SUS V/100, 85 V.I.) | | | | 8.7. |
| Mineral oil (150 SUS V/100, 95 V.I.) | | | | 8.5. |
| Mineral oil (550 SUS V/100, 95 V.I.) | | | | 72.8. |
| Inspections: | | | | |
| General | Soda or soda-lime soap—refined oil; oxidation inhibitor; no fillers. | | Soda-lime soap—refined oil; oxidation inhibitor; no fillers. | Soda-lime soap—refined oil; oxidation inhibitor; no fillers. |
| Mineral oil: | | | | |
| Flash, °F | | 340 (min.) | | |
| Fire, °F | | 380 (min.) | | |
| V/100° F. S.U.S. | 450–800 desired | | 410 | 400. |
| V/210° F. S.U.S. | | 50–75 | 58 | 57.5 |
| V.I. | 80 (min.) | | 94 | 90. |
| Soap | Max. content 13% | Approx. 10% | 8.9 | 8. |
| Copper corrosion ASTM D 130-49T | None | None | Pass | Pass. |
| ASTM wkd. pen | 340–370 | 340–370 | 354 | 366. |
| ASTM dropping pt., °F | 325 (min.) | 325 (min.) | 356 | 360. |
| Water percent | 0.5 (max.) | 0.5 (max.) | 0.05 | Nil. |
| Ash percent | 1.2 (min.) | | | |
| Free alkali percent | 0.5 (max.) | 0.5 (max.) | 0.14 | Neut. |
| Stability: After 5,000 strokes in ASTM grease worker, increase in pen. mm./10. | | 50 (max.) | 22 | 16. |
| Oil separation (bleeding): | | | | |
| A. 10 g. grease on 6 mesh galvanized screen for 24 hrs. at 210° F. Bleeding, percent. | 10 (max.) | | 8 | 15. |
| B. 185 g. grease in 28 mesh galvanized cone for 8 days at 130° F. Bleeding, percent. | | | 14 | 18. |
| Water resistance at 125° F.: U.S. ordinance VVL-791D —Grease loss percent. | | | 48 | 21. |
| Hardening tests at 130° F. and high humidity: | | | | |
| Micropenetration of grease: | | | | |
| Original | | | 192 | 198. |
| After 8 days storage | | | 208 | 212. |
| After 1 month storage | | | 180 | 172. |
| Micropenetration of grease+1.5% H$_2$O: | | | | |
| Original | | | 192 | 198. |
| After 8 days storage | | | 144 | 190. |
| After 1 month storage | | | 125 | 170. |
| Micropenetration of grease+3.0% H$_2$O: | | | | |
| Original | | | 192 | 198. |
| After 8 days storage | | | 125 | 170. |
| After 1 month storage | | | | 153. |

[1] Railroad specification is based on the requirements of a large Eastern railroad in the United States and Canada.

Lubricants suitable for railroad traction motor gears generally consist of a high viscosity asphaltic compound thickened somewhat by the addition of a soap or other thickening material of the type described above. The thickening agent is required in order to impart a yield value to the lubricant at the operating temperature and thus prevent leakage from the gear box. Conventional traction motor gear lubricants often show leakage in service due to the mechanical breakdown of the soap structure. In later stages of operation these lubricants usually exhibit an undesirable increase in viscosity due to oxidation and sufficient hardening may occur as to result in lubrication failure.

The incorporation in a steam reduced asphalt of a small proportion of a suitable complex of a metallic or nonmetallic soap with one of the alkali metal salt inhibitors of the invention results in a lubricant which is stable to mechanical shear and to oxidation over long periods. Specifically, complexes of sodium soaps or triethanolamine soaps with sodium phosphates and silicates are suitable for this purpose. From the standpoint of structural stability, the soaps of 12-hydroxy stearic acid are particularly desirable, while tri-sodium phosphate is the most effective inhibitor salt. These traction motor gear lubricants may be prepared in a manner analogous to that described above for greases thickened with soap-alkali metal salt complexes.

The invention is also applicable to greases thickened with cellulose or its equivalents. This is demonstrated by the data reported in Example XVI below.

EXAMPLE XVI

Acetone-exchanged cellulose as disclosed in U.S. Patent No. 2,682,506 (Serial No. 251,818, filed October 17, 1951) was combined with alkyd resin prepared by reacting maleic anhydride with glycerol mono-oleate in equimolar proportions. To this was added the mineral oil. The grease was then heated to drive off the acetone. To one portion (B) of this finished grease Na$_3$PO$_4$ (anhydrous) was added. Grease portions A and B were subjected to the grease hardening test. The composition of the greases and the test results are tabulated below.

| | Grease A | Grease B |
|---|---|---|
| Composition, weight percent: | | |
| Cellulose | 8.1 | 7.9 |
| Alkyd resin | 7.1 | 6.9 |
| Mineral oil (500 SSU at 100° F.; 90 V.I.) | 84.8 | 84.2 |
| Na$_3$PO$_4$ | | 1.0 |

| | Micro penetraton |
|---|---|
| Test results (after 600 hours at 300° F.): | |
| Grease A | 5 |
| Grease B | 27 |

It will be noted that grease B had hardened due to oxidation to a much lesser degree than grease A.

It is also within the concept of this invention to prepare lubricating grease compositions using as part of the base oil synthetic oils, such as, for example, silicone polymer oils, synthetic esters, synthetic ethers, polymerized hydrocarbons, and the like. To illustrate this concept of the invention, greases were prepared according to the procedure set out below:

EXAMPLE XVII 25 weight percent of sodium stearate was admixed with a small amount of a mineral lubricating oil having a viscosity at 100° F. of 675 S.S.U. and a viscosity index of 80, the mixing being continued until complete dispersion was attained. The temperature of the mixture was then increased to one in the neighborhood of 400° F., at which point 60% by weight of di-2-ethylhexyl sebacate was blended in. The heated mixture was then cast and allowed to cool to handling temperature. It was then worked to obtain a smooth grease structure.

EXAMPLE XVIII

A second sample of an identical grease composition was prepared differing from the first in that at 410° F., 3.8% of a solution of tri-sodium phosphate was added and the mixture dehydrated before the addition of the sebacate ester. Upon cooling and working a smooth grease composition resulted. These two grease compositions were submitted to the standard inspection tests as described above. The results of these tests are set out in the table below:

SYNTHETIC ESTER BASE GREASE

| Designation | | |
|---|---|---|
| Formula, percent by weight: | | |
| Sodium Stearate | 25.0 | 25.0 |
| Mineral oil [1] | 15.0 | 15.0 |
| $Na_3PO_4$ (anhydrous) | | 3.8 |
| Di-2-ethylhexyl sebacate | 60.0 | 56.2 |
| Inspections: | | |
| Micro penetration | 290 | 55 |
| Grease Hardening Test at 300° F.—After 100 hours in oven: | | |
| Micro penetration | 5– | 31 |
| Color of grease | Black | Pale Yellow |
| Loss in weight, percent | 60 | 9 |

[1] Mineral of oil having a viscosity at 100° F. of 675 S.S.U. and a V.I. of 80.

Prior to the present invention, it has been suggested that a lubricating grease of good quality may be prepared by incorporating a suitable lubricating oil, e.g., a mineral base or synthetic oil, into silica gels and analogous materials by replacement of their normal water content. It has also been suggested that in order to prevent displacement of the oil by moisture while the lubricant is in service, it is desirable or necessary to moisture-proof the grease in some manner. This may be done in various ways, e.g., by treatment of the gel or the grease with alkyd resins or modified alkyd resins, silicones, amino silanes, polystyrene, etc.; as disclosed, e.g., in the Sirianni and Puddington Patents Nos. 2,583,603; 2,583,604; 2,583,605 and 2,583,606. The present invention contemplates greases which preferably are water-proofed but it also comprehends greases not so treated.

The oxidation resistance of these silica gel greases, which is not too satisfactory in sustained high temperature service, may be very substantially improved by the addition of the alkali metal salt inhibitors, particularly the alkali metal phosphates of the invention, preferably the di-and tri-sodium phosphates. These alkali metal salts may be introduced into the silica gel grease in at least two basically different ways.

(1) Silica gel may be precipitated from sodium silicate by the addition of phosphoric acid. The acidity of the product is preferably controlled so that the pH value is held at about 8 or higher. The reaction of phosphoric acid with sodium silicate results, of course, in the formation of sodium phosphate as a by-product. Part of this sodium phosphate may be removed from the gel by water-washing but part of it is retained. If desired, the entire quantity may be allowed to remain in the gel, but usually it is preferred to remove part of it. Thereafter, the gel containing an appreciable quantity of water soluble sodium phosphate is washed with a mutual solvent for oil and water to replace all its water content.

The preferred mutual solvent is acetone, because of its volatility, but the aliphatic alcohols, esters, ethers and halogen derivatives thereof, which have reasonably low boiling points and critical pressures, and which are reasonably soluble in both oil and water, may be used, such as ethyl acetate, butyl alcohol, diethyl ether and the like.

The silica gel, now wet with the mutual solvent, is next mixed with mineral oil and the water-proofing agent, e.g., alkyd resin. When the product is to be water-proofed the water-proofing agent, such as alkyd resin, amino silane polymer, polystyrene, etc., is preferably introduced in a solution of the mutual solvent or of mineral oil or some other oil miscible solvent. The mixture is then heated to remove the acetone (or other volatile mutual solvent) and the product is thereafter passed through a colloid mill or equivalent shearing device to make a smooth grease composition.

Alternatively, in the first method, the silica gel, wet with acetone or other volatile solvent for water, is charged to an autoclave where the water solvent is removed above its critical temperature. In this case the solvent need not be a solvent for the oil. By this process, a true silica aerogel is obtained. This aerogel may be made water-resistant before incorporating the oil by adding an acetone solution of the alkyd resin or equivalent water-proofing agent, prior to the autoclaving stage. If desired, however, the silica aerogel may be mixed with the selected lubricating oil and the alkyd resin, or other waterproofing agent added, preferably in solution as above. If a volatile solvent, e.g., acetone, is used to dissolve the alkyd resin, it is subsequently removed by heating.

In either case the resulting grease preferably is passed thereafter through a colloid mill or other mechanical shearing device to obtain a smooth grease structure.

(2) In the second basic method, sodium phosphate, or any of the other alkali metal salt inhibitors of the invention may be added directly to silica gel greases which have been prepared by prior art methods. As is now known, such greases may be prepared either from conventional silica aerogels or from ordinary silica gels which have their normal water content replaced with acetone or other mutual oil and water solvent. When silica aerogels are employed, they may be the standard commercial silica aerogels. These are relatively expensive. Gels may be prepared at the time of use by precipitating sodium silicate with any conventional acid, e.g. sulfuric acid, acetic acid, hydrochloric acid, etc., and washing the product free of sodium sulfate, acetate, chloride, etc. In lieu of such acids phosphoric or phosphorous acids and the like, may be used as is well known in the art. In this second method, all or substantially all of the water soluble salt is removed. The desired sodium (or other alkali metal) phosphate or silicate is then added directly.

Where the salt inhibitors are to be added directly, they are preferably dried and ball-milled to reduce them to a finely divided state. Of the alkali metal phosphates the tri-sodium phosphate is preferred and di-sodium monohydrogen phosphate is second choice.

The quantities of salt inhibitor incorporated into these lubricating greases may be varied rather widely, but proportions of from 0.25 to about 10%, based on the total weight of the finished grease composition, are preferred. Specifically, proportions of about 1 to 2% are considered most desirable for greases subjected to sustained service at high operating temperatures. The silica gel content may be varied widely, depending on the desired consistency of the grease. Ordinarily, it will form about 5 to 15% of the total grease weight based on the dry silica gel, but in exceptional cases considerably more may be used. The amount of water-proofing agent used is between about 0.1 and 10% of the total weight of the composition. Where water-proofing is unnecessary it may be omitted but it is usually employed preferably in proportions of 2 to 6%. This embodiment will be more fully understood by reference to the following examples:

SILICA GEL GREASE—EXAMPLE I

A silica aerogel was prepared by precipitating sodium silicate with sulfuric acid at a pH of about 8 and washing with water about 5 complete washes until the resulting gel was substantially free of sodium sulfate. Prior to autoclaving, about 65% by weight, based on the dry silica aerogel, of an alkyd resin of medium molecular weight, in a volatile solvent, acetone, was added to the gel. The product thereafter was autoclaved, as described above, by heating above the critical temperature of the solvent material (acetone) until the aerogel was completely dry.

The alkyd resin-coated silica aerogel which resulted was next mixed with mineral lubricating oil (viscosity about 500 S.S.U. at 100° F., viscosity index about 89), and the oil and aerogel were thoroughly milled to form a smooth grease. The properties of this grease are shown in the table below. This product contained no phosphate.

SILICA GEL GREASE—EXAMPLE II

A second alkyd resin-coated silica aerogel was prepared as above except that the silica was precipitated from sodium silicate with phosphoric acid. The silica gel was washed only twice with water, leaving a residual water-soluble sodium salt content (mostly di-sodium phosphate) of about 1.8%, based on the total grease composition. Proportions of 8.3% by weight of the silica aerogel, 5.7% of the alkyd resin and 85% of the same mineral oil as in Example I were combined and milled to prepare the grease.

The products of both Silica Gel Examples I and II were further modified by adding to each about 1% by weight, based on the total composition, of phenyl alpha-naphthylamine as an antioxidant. The two greases had substantially the same worked penetrations and the same dropping points. However, the grease of Silica Gel Example I showed a spindle life in the high speed spindle test of only 406 hours while the product of Silica Gel Example II showed a life of 1350 hours.

The bearing life tests were made by the standard ABEC-NLGI spindle test. In this test a single row ball bearing is packed with 3.0 grams of grease and driven on a spindle at 10,000 r.p.m. while temperature is maintained at 300° F. The bearing is driven until it fails due to lack of lubrication. The bearing is sealed and, therefore, the life of the grease is largely governed by its resistance to oxidation.

The alkyd resins used in silica gel Examples I and II were prepared from citric acid anhydride and glyceryl monoricinoleate.

SILICA GEL GREASE—EXAMPLE III

As an example of a grease made by the second method of preparation which has been described above, an acetone-wet silica gel was prepared by precipitating the sodium silicate with sulfuric acid, water-washing and exchanging the water with acetone. The alkyd resin ingredients (glyceryl monoricinoleate and citric acid anhydride) were added in acetone solution to the acetone-wet silica gel in the autoclave. After autoclaving the charge above the critical temperature and pressure of acetone, the alkyd resin-coated silica aerogel was mixed with mineral oil in the proper proportions and then with 4% of anhydrous tri-sodium phosphate which was finely ground by ball-milling. The mixture was milled to form a smooth homogeneous grease. It had an A.S.T.M. dropping point of 502° F.

The data are summarized in the following table. The alkyd resin in each case was prepared from citric acid anhydride and glycerol monoricinoleate.

TABLE XIX

| Grease designation | Example I | Example II | Example III |
|---|---|---|---|
| Composition (percent by weight): | | | |
| Silica aerogel | 5.1 | 6.5 | 10.8 |
| Alkyd resin | 3.2 | 6.7 | 5.2 |
| Water-soluble sodium salts | [1] 0.2 | [2] 1.8 | [3] 4.0 |
| Mineral oil (v/100:500 S.S.U.V.I. 89) | 90.5 | 85.0 | 80.0 |
| Phenyl alpha-naphthylamine (antioxidant) | 1.0 | 1.0 | |
| Inspections: | | | |
| Worked penetration, 77° F | 270 | 275 | |
| A.S.T.M. dropping point, ° F | 445+ | 450+ | 502 |
| ABEC-NLGI spindle life (300° F.—10,000 r.p.m.), hours | 406 | 1,350 | |

[1] Sodium sulfate.
[2] Di-sodium phosphate.
[3] Tri-sodium phosphate.

A silica grease prepared in a similar manner but waterproofed with an alkyd resin prepared from a mixture of 44% phthalic anhydride, 24.4% castor oil fatty acids, 9.6% linoleic acid and 22% glycerol was oxidation inhibited as described above with 1% $Na_3PO_4$. This grease had a micro penetration of 41 mm./10 after 600 hours at 300° F.

It will be understood, of course, that various conventional modifiers, such as other anti-oxidants, viscosity index improvers, extreme pressure agents, pour point depressors, and the like, may be incorporated in the silica gel greases, preferably by addition to the oil before the grease is formed. Also, while this grease is referred to above as being silica gel grease, it may be prepared by using other voluminous precipitates, such as aluminum hydroxide, ferric hydroxide, and the like. The general equivalence of these materials for the formation of non-soap thickened lubricating greases is disclosed in the foregoing copending Sirianni and Puddington application. By the same token, synthetic oils of the type described above may replace part of the mineral oil base in the silica gel greases of the invention.

The alkali metal salt inhibitors of the invention, particularly the poly-alkali metal phosphates and preferably tri-sodium phosphate, also inhibit the oxidation deterioration of greases thickened with finely divided amorphous silica.

The finely divided silica used as the thickener is an amorphous substantially anhydrous $SiO_2$ having an ultimate particle size of about 5 to 100 millimicrons, for example 10 to 50 millimicrons. About 3 to 30% by weight of this material, based on total grease composition, is normally sufficient for the formation of useful greases. A range of about 5 to 15 wt. percent of silica is preferred.

The lubricating oil may be chosen to suit the particular function of the grease. Mineral base oils having viscosities ranging from about 50 SSU at 100° F. to about 1,000 SSU at 210° F. are preferred. However, the synthetic oils described above may be used in combination with mineral oils as the lubricating oil base of these greases. Small proportions of vegetable or animal oils and small amounts of conventional modifiers, such as anti-oxidants, e.g. phenyl alpha naphthylamine; corrosion inhibitors, e.g. sorbitan monostearate; tackiness agents, e.g. latex; load-carrying agents, e.g. mixtures of lead oleate and sulfurized fatty oils; viscosity index improvers, e.g. polyisobutylene; etc. may likewise be added to the grease.

Greases thickened with amorphous silica may, quite generally, be prepared as follows:

The silica is mixed with the cold oil in a conventional grease mixer. Conventional additives, if any, may then be mixed in. Finally, the tri-sodium phosphate is added either as a fine dry powder or as a dispersion obtained by ball-milling the sodium phosphate in oil. The mixture is then milled in a suitable shearing device in order to obtain the optimum thickening power of the silica. For most purposes, it is desirable to render the grease water resistant. This may be done in various ways, e.g. by treatment of the grease or, preferably, of the silica with water-proofing agents, such as those disclosed in said U.S. Patent Nos. 2,583,603–6, or other agents of similar activity. Also, the hydrophobic silica described in U.S. Patents 2,657,149 and 2,676,148 (Du Pont) may be used without further water-proofing agents.

The following specific example illustrates this embodiment of the invention:

AMORPHOUS SILICA GREASE—EXAMPLE I

Two lubricating greases were prepared by mixing finely divided amorphous silica with mineral oil and passing through a colloid mill. The mineral oil was a solvent refined distillate having a viscosity of about 500 SSU at 100° F. and a viscosity index of 90. The amorphous silica was finely divided water resistant substantially anhydrous $SiO_2$ of about 87% purity manufactured and sold by Du Pont under the trade name "Du Pont Hydrophobic Silica" described in U.S. Patent Nos. 2,657,149 and 2,676,148.

To one of the greases was added about 1% of powdered anhydrous tri-sodium phosphate. Both greases contained 1% phenyl alpha naphthylamine. The oxidation resistance of each grease was evaluated on the high speed spindle (300° F., 10,000 r.p.m.). The improvement brought about by the addition of tri-sodium phosphate is shown in the table below.

| | A | B |
|---|---|---|
| Formula, weight percent: | | |
| Amorphous silica | 13 | 12.2 |
| Mineral oil | 86 | 85.8 |
| Phenyl alpha naphthylamine | 1 | 1.0 |
| Tri-sodium phosphate (anhydrous) | -------- | 1.0 |
| Inspections: | | |
| Worked penetration, mm./10, 77° F. (60 strokes) | 304 | 292 |
| Spindle life at 300° F. and 10,000 r.p.m., hours | 448 | 1,210 |
| Water absorption at 150° F. (number of ccs. of water absorbed per 100 grams of grease worked in ASTM worker) | 11 | 11 |
| Penetration after working 10,000 strokes in fine-hole worker | 300 | 292 |
| Wheel Bearing Test—6 hours at 220° F., 440 r.p.m.: | | |
| Grease leakage | -------- | 0.2 |
| Rating | -------- | Excellent |

It will be noted that the grease of the invention had about 3 times the spindle life of a silica grease free of tri-sodium phosphate, while being at least equivalent in all other respects. When 6.5% $Na_3PO_4$ was added rather than 1.0%, a micro penetration of 5 mm./10 was obtained after 2,100 hours.

AMORPHOUS SILICA GREASE—EXAMPLE II

A grease thickened with amorphous silica was prepared essentially as described above except that di-sodium phosphate was used as the inhibitor instead of tri-sodium phosphate. The composition of this grease and the results of the grease hardening test are tabulated below.

Composition, wt. percent:
  Amorphous silica _____ 10.0
  $Na_2HPO_4$ _____ 1.0
  Mineral oil (60 SSU at 210° F., 90 V.I.) _____ 89.0
Test results: Micro penetration after 600 hours at 300° F. _____ 40

Results obtained by the addition of the salt inhibitors of the invention to various greases thickened with other inorganic thickeners are reported below.

A. MODIFIED BENTONITE GREASES

A modified bentonite clay powder prepared by treating bentonite with a quaternary ammonium alkyl salt in a conventional manner was added to mineral oil along with 1–3% of acetone based on total composition. After stirring at room temperature for ½ hour the grease was milled. Separate portions (C and D) of this grease were mixed at room temperature with di-sodium phosphate (grease C) and tri-sodium phosphate (grease D), respectively, using 2.5 wt. percent, based on total grease, of anhydrous phosphate concentrates containing 40% phosphate, 50% mineral oil (105 SSU at 210° F., V.I. 90) 9% sodium 12-hydroxy stearate soap and about 1% sodium sulfonate. The greases were evaluated by the grease hardening test. The composition of these greases and the test results are tabulated below.

| Composition, weight percent | Grease | | | |
|---|---|---|---|---|
| | A | B | C | D |
| Modified bentonite | 6.5 | 8.0 | 6.5 | 7.8 |
| Acetone | 1.5 | 2.0 | 1.5 | 2.0 |
| Mineral oil | [1] 91.7 | [2] 90.0 | [1] 90.45 | [2] 88.95 |
| Organic anti-oxidant | 0.3 | -------- | 0.3 | -------- |
| Soap plus sulfonate | -------- | -------- | 0.25 | 0.25 |
| $Na_3PO_4$ | -------- | -------- | 1.0 | -------- |
| $Na_2HPO_4$ | -------- | -------- | -------- | 1.0 |

| Test results (300° F. storage temperature) | Micro penetration |
|---|---|
| Grease A | 5 mm./10 after 600 hrs. |
| Grease C | 5 mm./10 after 2160 hrs. |
| Grease B | 8 mm./10 after 625 hrs. |
| Grease D | 51 mm./10 after 625 hrs. |

[1] 105 SSU at 210° F.; 90 V.I.
[2] 60 SSU at 210° F.; 90 V.I.

The superiority of greases C and D containing sodium phosphates is manifest.

B. ATTAPULGITE GREASES

Finely divided attapulgite clay was mixed with mineral oil and a small amount of commercial surface active materials containing hydrophilic groups (OH or $NH_2$ groups) and oleophilic groups (alkyl groups). The mixture was heated under pressure to about 300° F. and milled while preventing water losses. To portions of this grease (greases B and C) small quantities of $Na_2HPO_4$ (grease B) and $Na_3PO_4$ (grease C) were added as described under A above. The compositions of these greases and the results of grease hardening tests are tabulated below.

| Composition, weight percent | Greases | | |
|---|---|---|---|
| | A | B | C |
| Attapulgite | 11.4 | 11.4 | 11.4 |
| Surface active agents | 3.0 | 3.0 | 3.0 |
| Mineral Oil (60 SSU at 210° F.; 90 V.I.) | 84.7 | 83.45 | 83.45 |
| Organic oxidation inhibitor | 0.9 | 0.9 | 0.9 |
| Soap plus sulfonate | -------- | 0.25 | 0.25 |
| $Na_3PO_4$ | -------- | -------- | 1.0 |
| $Na_2HPO_4$ | -------- | 1.0 | -------- |

| Test results, grease | Micro penetration after storage at 300° F., mm./10 |
|---|---|
| A | 5 (after 750 hours). |
| B | 39 (after 600 hours). |
| C | 5 (after 1400 hours). |

The superiority of greases B and C over the attapulgite grease free of sodium phosphates is evident.

C. CARBON BLACK GREASE

An acetylene carbon black was stirred into mineral oil and a small amount of anhydrous tri-sodium phosphate was incorporated as described under A above.

The composition of this grease and the result of a grease hardening test are shown below.

Composition, weight percent:
| | |
|---|---|
| Acetylene black | 7.0 |
| Soap + sulfonate | 0.25 |
| Na$_3$PO$_4$ | 1.0 |
| Mineral oil (300 SSU at 100° F.; 75 V.I.) | 91.75 |

Grease hardening test: Micro penetration, mm./10 after 600 hours at 300° F. _____ 23

This test result indicates a grease of good quality in spite of the use of a base oil of relatively low viscosity.

It will be understood that the improved oleaginous materials prepared in accordance with the invention may contain other conventional modifiers, such as other antioxidants, e.g. phenyl alpha naphthylamine; corrosion inhibitors, e.g. sorbitan esters of fatty acids; tackiness agents, e.g. polyisobutylene of about 1,000 mol. wt.; viscosity index improvers, e.g. polyisobutylene of about 15,000–20,000 mol. wt.; detergents, e.g. calcium sulfonate, sodium sulfonate, etc.; extreme pressure agents, e.g. sulfurized sperm oil or chlorinated wax; etc.

The invention is not limited to the specific figures of the foregoing examples. The relative proportions of the materials used and the reaction conditions may be varied within the limits indicated in the specification to obtain products of varying characteristics.

What is claimed is:

1. A substantially anhydrous lubricating composition comprising a major proportion of an oil of lubricating grade, and an oxidation inhibiting and extreme pressure performance improving amount of trisodium orthophosphate.

2. The composition of claim 1 wherein said trisodium orthophosphate is present in an amount in the range of 0.1 to 10 wt. percent.

3. The composition of claim 1 wherein said composition is thickened to a grease consistency with a non-soap type grease thickener.

4. The composition of claim 1 wherein a dispersant is used to disperse said trisodium orthophosphate.

5. The composition of claim 4 wherein said dispersant comprises an oil-soluble metallic sulfonate.

6. A substantially anhydrous lubricating grease composition comprising a major proportion of an oil of lubricating grade, a grease-forming amount of a carboxylic acid soap, and an oxidation inhibiting and extreme pressure performance improving amount of trisodium orthophosphate.

7. The composition of claim 6 wherein said soap is a sodium soap.

8. The composition of claim 6 wherein said carboxylic acid consists of 12-hydroxy stearic acid.

9. The composition of claim 6 comprising in addition thereto, an oxidation inhibiting amount of a phenyl naphthylamine.

10. The composition of claim 6 wherein said trisodium orthophosphate is present in an amount in the range of 0.5 to 10 wt. percent.

11. The composition of claim 6 comprising in addition thereto, a metal salt of a carboxylic acid having in the range of 1 to 5 carbon atoms per molecule.

12. The composition of claim 7 wherein said trisodium orthophosphate exists as a complex with said sodium soap.

13. The composition of claim 11 wherein said salt is calcium acetate.

14. A substantially anhydrous lubricating grease composition comprising a major proportion of a mineral oil of lubricating grade having a viscosity in the range of 100 to 5000 SSU at 100° F. and a viscosity index of at least 55, thickened within the range of 5 to 40 wt. percent of sodium 12-hydroxy stearate, and containing in the range of 0.5 to 10 wt. percent of trisodium orthophosphate as an antioxidant and extreme pressure agent.

15. A substantially anhydrous lubricating grease composition comprising a major proportion of an oil of lubricating grade, in the range of 3 to 30 wt. percent of silica gel (dry weight) as a thickening agent, and in the range of 0.25 to 6 wt. percent of trisodium orthophosphate as an antioxidant and extreme pressure agent.

References Cited in the file of this patent

UNITED STATES PATENTS

| | | |
|---|---|---|
| 2,079,051 | Sullivan et al. | May 4, 1937 |
| 2,257,545 | Curtis | Sept. 30, 1941 |
| 2,401,614 | Chechot et al. | June 4, 1946 |
| 2,413,855 | Berl | Jan. 7, 1947 |
| 2,417,827 | Jones | Mar. 25, 1947 |
| 2,432,784 | Miller et al. | Dec. 16, 1947 |
| 2,444,970 | Zimmer et al. | July 13, 1948 |
| 2,455,659 | Duncan et al. | Dec. 7, 1948 |
| 2,466,647 | Stern | Apr. 5, 1949 |
| 2,483,800 | Zimmer et al. | Oct. 4, 1949 |
| 2,485,861 | Campbell et al. | Oct. 25, 1949 |
| 2,490,949 | De Lorenzo | Dec. 13, 1949 |
| 2,501,731 | Mertes | Mar. 28, 1950 |
| 2,513,680 | Schott et al. | July 4, 1950 |
| 2,514,331 | Morway | July 4, 1950 |
| 2,533,878 | Clark et al. | Dec. 12, 1950 |
| 2,623,016 | Mertes | Dec. 23, 1952 |
| 2,626,899 | Abrams et al. | Jan. 27, 1953 |
| 2,648,633 | Peterson et al. | Aug. 11, 1953 |

FOREIGN PATENTS

| | | |
|---|---|---|
| 1,378 | Great Britain | May 23, 1871 |
| 3,855 | Great Britain | Sept. 5, 1881 |
| 850,051 | Germany | Sept. 22, 1952 |

OTHER REFERENCES

Metal Working Lubricants, by Bastian, McGraw-Hill, 1951, pages 292–297.

Smith's College Chemistry, 6th edition (1946) by Ehret, D. Appleton-Century Co., New York, p. 371.